United States Patent
Forristal et al.

(10) Patent No.: US 11,727,274 B1
(45) Date of Patent: Aug. 15, 2023

(54) DEEP LEARNING MODEL TRAINING SYSTEM

(71) Applicant: SAS Institute Inc., Cary, NC (US)

(72) Inventors: Jarad Forristal, Marfa, TX (US); Joshua David Griffin, Harrisburg, NC (US); Seyedalireza Yektamaram, Rotterdam (NL); Wenwen Zhou, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/820,342

(22) Filed: Aug. 17, 2022

Related U.S. Application Data

(60) Provisional application No. 63/344,501, filed on May 20, 2022, provisional application No. 63/331,751, filed on Apr. 15, 2022.

(51) Int. Cl.
  *G06N 3/08* (2023.01)
  *G06F 18/211* (2023.01)

(52) U.S. Cl.
  CPC ............ *G06N 3/08* (2013.01); *G06F 18/211* (2023.01)

(58) Field of Classification Search
  CPC .................. G06N 3/08; G06F 18/211
  See application file for complete search history.

(56) References Cited

PUBLICATIONS

Chen, C. et al, Fast Approximation of the Gauss-Newton Hessian Matrix for the Multilayer Perceptron, [retrieved Jan. 27, 2023]. Retrieved from Internet:<https://ui.adsabs.harvard.edu/abs/2019arXiv191012184C/abstract> (Year: 2019).*

Cartis, C. et al, Adaptive Cubic regularisation methods for unconstrained optimization. Part I: motivation, convergence and numerical results, [retrieved Jan. 27, 2023]. Retrieved from Internet:<https://link.springer.com/article/10.1007/s10107-009-0286-5> (Year: 2011).*

Alain, G. et al, Negative eigenvalues of the Hessian in deep neural networks, [retrieved Jan. 27, 2023]. Retrieved from Internet:< https://arxiv.org/abs/1902.02366> (Year: 2019).*

(Continued)

*Primary Examiner* — Miranda M Huang
*Assistant Examiner* — Bart I Rylander
(74) *Attorney, Agent, or Firm* — Bell & Manning, LLC

(57) ABSTRACT

A computer trains a neural network. A neural network is executed with a weight vector to compute a gradient vector using a batch of observation vectors. Eigenvalues are computed from a Hessian approximation matrix, a regularization parameter value is computed using the gradient vector, the eigenvalues, and a step-size value, a search direction vector is computed using the eigenvalues, the gradient vector, the Hessian approximation matrix, and the regularization parameter value, a reduction ratio value is computed, an updated weight vector is computed from the weight vector, a learning rate value, and the search direction vector or the gradient vector based on the computed reduction ratio value, and an updated Hessian approximation matrix is computed from the Hessian approximation matrix, the predefined (Continued)

learning rate value, and the search direction vector or the gradient vector based on the reduction ratio value. The step-size value is updated using the search direction vector.

30 Claims, 14 Drawing Sheets

(56) References Cited

PUBLICATIONS

Erway, J. et al, Trust-Region Algorithms for Training Responses: Machine Learning Methods Using Indefinite Hessian Approximations, [retrieved Jan. 27, 2023]. Retrieved from Internet:<:// efaidnbmnnnibpcajpcglclefindmkaj/https://www.researchgate.net/ profile/Josh-Griffin/publication/326145437_> (Year: 2018).*
Griffin, Joshua D., et al. "A minibatch stochastic Quasi-Newton method adapted for nonconvex deep learning problems." (2022).
Sutskever, Ilya, et al. "On the importance of initialization and momentum in deep learning." International conference on machine learning. PMLR, 2013.
Liu, Liyuan, et al. "On the variance of the adaptive learning rate and beyond." arXiv preprint arXiv:1908.03265 (2019).
Yao, Zhewei, et al. "Adahessian: An adaptive second order optimizer for machine learning." Proceedings of the AAAI Conference on Artificial Intelligence. vol. 35. No. 12. 2021.
Zhuang, Juntang, et al. "Adabelief optimizer: Adapting stepsizes by the belief in observed gradients." Advances in neural information processing systems 33 (2020): 18795-18806.
Dennis, Jr, John E., and Jorge J. Moré. "Quasi-Newton methods, motivation and theory." SIAM review 19.1 (1977): 46-89.
Erway, Jennifer B., et al. "Trust-region algorithms fortraining responses: machine learning methods using indefinite Hessian approximations." Optimization Methods and Software 35.3 (2020): 460-487.
Griffin, Joshua D., et al. "A minibatch stochastic Quasi-Newton method adapted for nonconvex deep learning problems."
Cartis, Coralia, Nicholas IM Gould, and Philippe L. Toint. "Adaptive cubic regularisation methods for unconstrained optimization. Part I: motivation, convergence and numerical results." Mathematical Programming 127.2 (2011): 245-295.
"Adaptive Regularized Cubics Using Quasi-Newton Approximations." ICLR Conference Paper under Review. 2022. pp. 1-11.
SAS Institute Inc. 2017. SAS® Visual Data Mining and Machine Learning 8.2: Deep Learning Programming Guide. Cary, NC: SAS Institute Inc. pp. 1-124.
SAS Institute Inc. 2019. SAS® Visual Data Mining and Machine Learning 8.5: Procedures. Cary, NC: SAS Institute Inc. pp. 79.
Goodfellow, Ian, Yoshua Bengio, and Aaron Courville. Deep learning. MIT press, 2016. Chapter 6.2.
Goodfellow, Ian, Yoshua Bengio, and Aaron Courville. Deep learning. MIT press, 2016. Chapter 7.
Goodfellow, Ian, Yoshua Bengio, and Aaron Courville. Deep learning. MIT press, 2016. Chapter 5.9.
Goodfellow, Ian, Yoshua Bengio, and Aaron Courville. Deep learning. MIT press, 2016. Table of Contents.
Burdakov, Oleg, et al. "On efficiently combining limited-memory and trust-region techniques." Mathematical Programming Computation 9.1 (2017): pp. 101-134.
Brust, Johannes, Jennifer B. Erway, and Roummel F. Marcia. "On solving L-SR1 trust-region subproblems." Computational Optimization and Applications 66.2 (2017): pp. 245-266.
SciPy v1.9.0 Manual. The SciPy community. https://docs.scipy.org/doc/scipy/reference/generated/scipy.linalg.eigh.html. Aug. 1, 2022.
Gockenbach, Mark S. "The trust region subproblem." https://pages.mtu.edu/~msgocken/ma5630spring2003/lectures/tr/tr/node2.html. Feb. 25, 2003.

\* cited by examiner

DEEP LEARNING MODEL TRAINING SYSTEM

CROSS-REFERENCE TO RELATED APPLICATIONS

The present application claims the benefit of and priority to 35 U.S.C. § 119(e) to U.S. Provisional Patent Application No. 63/344,501 filed May 20, 2022 and to U.S. Provisional Patent Application No. 63/331,751 filed Apr. 15, 2022, the entire contents of which are hereby incorporated by reference.

BACKGROUND

When training deep learning models, stochastic gradient descent (SGD) is the most widely used optimization method though it can be very sensitive to hyperparameter values and is not straightforward to parallelize. SGD variants, such as ADAM-SGD and Momentum-SGD, have been proposed to improve SGD performance. Though these variants can be more efficient and more robust, tuning their hyperparameters remains a daunting task. Scalable second-order methods for training deep learning problems great potential, but are significantly more expensive to use, and arguably require more sophisticated automatic differentiation architecture than that required by SGD. Quasi-Newton (QN) methods are a natural higher level alternative to first-order methods, in that they seek to learn curvature information dynamically from past steps based on gradient information. Thus, they can work out of the box in the same settings as SGD with little model specific coding required. As a type of QN method, the limited memory Broyden-Fletcher-Goldfarb-Shanno algorithm (L-BFGS) generally requires fewer iterations to converge, requires much less hyperparameter tuning, and is naturally parallelizable. Though there has been some progress recently in using stochastic L-BFGS for machine learning, stochastic L-BFGS overall is not as efficient as SGD for deep learning because it may become trapped in local minima, may require a long training time, and may produce large errors.

SUMMARY

In an example embodiment, a computer-readable medium is provided having stored thereon computer-readable instructions that when executed by a computing device, cause the computing device to train a neural network model. (A) A batch of observation vectors is selected. The batch of observation vectors includes a mini-batch number of observation vectors selected from a plurality of observation vectors. Each observation vector of the plurality of observation vectors includes a value for each variable of a plurality of variables. (B) A neural network is executed with a weight vector to compute a gradient vector using the selected batch of observation vectors. The neural network includes a layer type for each layer of a plurality of neural network layers. The weight vector includes a weight value defined for each neuron of the neural network. The gradient vector includes a gradient value defined for each neuron of the neural network. (C) A vector of eigenvalues is computed from a Hessian approximation matrix. (D) A regularization parameter value is computed using the computed gradient vector, the computed vector of eigenvalues, and a step-size value. (E) A search direction vector is computed using the computed vector of eigenvalues, the computed gradient vector, the Hessian approximation matrix, and the computed regularization parameter value. (F) A reduction ratio value is computed as a ratio of a decrease in an objective function value from the execution of the neural network to a predicted decrease in the objective function value from the execution of the neural network. (G) An updated weight vector is computed for each neuron of the neural network from the weight vector, a predefined learning rate value, and either the computed search direction vector or the computed gradient vector based on the computed reduction ratio value. (H) An updated Hessian approximation matrix is computed from the Hessian approximation matrix, the predefined learning rate value, and either the computed search direction vector or the computed gradient vector based on the computed reduction ratio value. (I) The step-size value is updated using the computed search direction vector. (J) (A) through (I) are repeated until a stop criterion is satisfied, wherein, on a next iteration of (A) through (I), the step-size value is the updated step-size value, and the weight vector is the computed, updated weight vector. The computed, updated weight vector is output to describe a trained neural network model.

In another example embodiment, a computing device is provided. The computing device includes, but is not limited to, a processor and a computer-readable medium operably coupled to the processor. The computer-readable medium has instructions stored thereon that, when executed by the processor, cause the computing device to train a neural network model.

In yet another example embodiment, a method of training a neural network model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
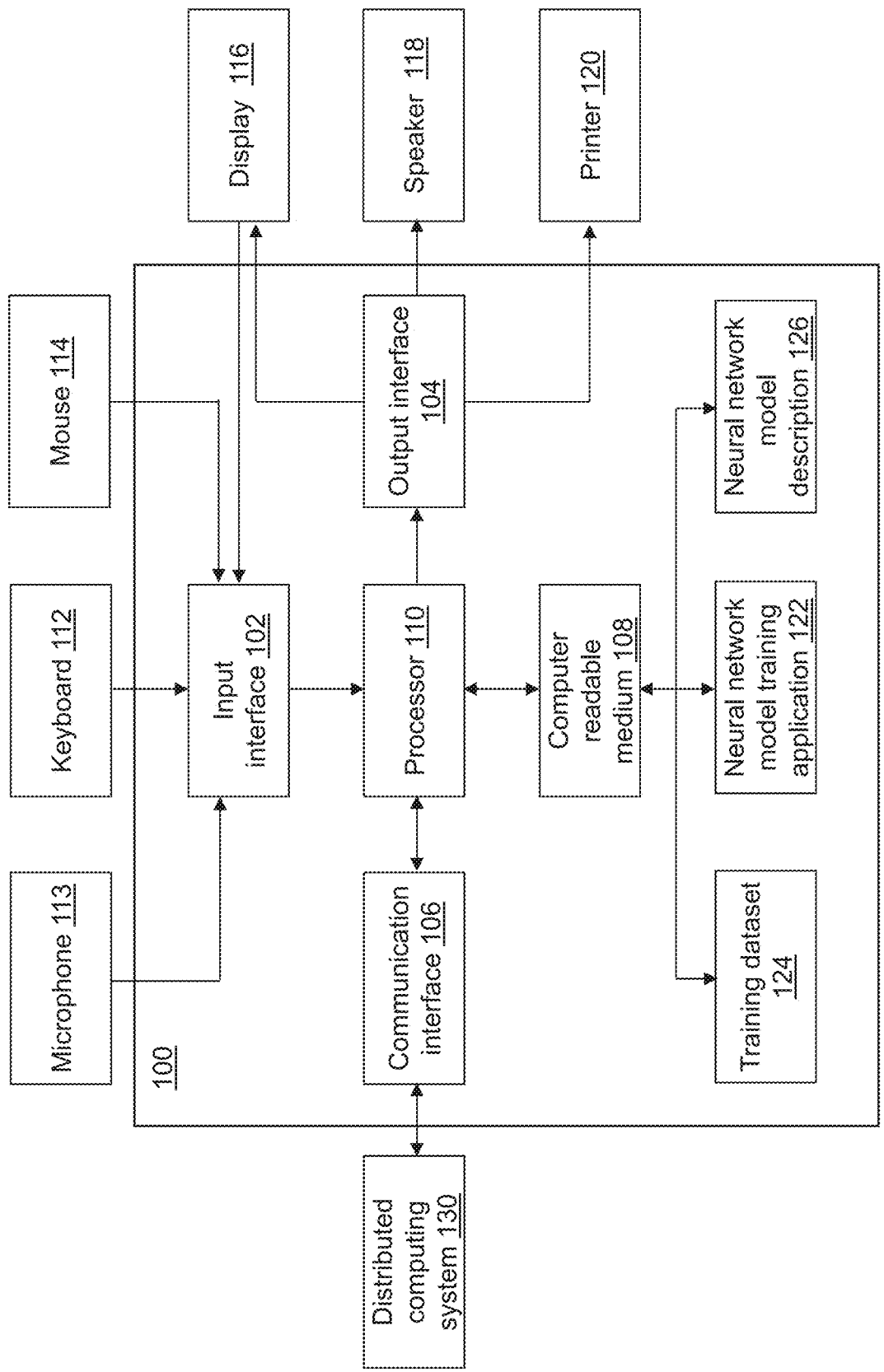
FIG. 1 depicts a block diagram of a neural network model training device in accordance with an illustrative embodiment.

Neural networks are a class of machine learning models that consist of one or more transformation layers. Loosely speaking, each layer inputs a set of weights denoted by the matrix $W \in \mathbb{R}^{h \times m}$, a set of neurons $x \in \mathbb{R}^m$, and a bias term $\tau \in \mathbb{R}^m$. The set of weights are the neural network parameters. The corresponding output of the layer is itself a set of neurons $a(x) \in \mathbb{R}^h$ defined by the transformation:

$$a(x) = \theta(Wx + \tau),$$

where $\theta$ denotes the corresponding activation function. If there are l layers and the set of pairs $(W, \tau)$ are indexed by their corresponding layer index, the union of the set of parameters $\cup \{W_i, \tau_i\}_{i=1}^l$ becomes the corresponding optimization variables or parameters. For simplicity, a map from this set to a weight vector $w \in \mathbb{R}^m$ is assumed, where m corresponds to a total number of neurons across all layers. Henceforth, all notation is with respect to the weight vector w.

Deep learning models are a class of neural networks consisting of many layers. As in other machine learning approaches, in deep learning, a loss function is minimized $$\min_{w \in \mathbb{R}^m} f(w) = \frac{1}{N} \sum_{i=1}^{N} f_i(w; x_i, t_i),$$

where each $f_i(w)$ provides a measure of accuracy for the deep learning model applied to the $i^{th}$ observation in a training dataset which consists of N observations, $x_i$ indicates an observation vector, and $t_i$ indicates a target variable. $f_i(w)$ may be described as a loss or objective function. Because N may be arbitrarily large in the world of big data, stochastic sampling methods are attractive. Instead of evaluating $f(w)$ each iteration, inexpensive approximations to $f(w)$ using small randomly sampled sets, $X_b \subset \{1, \ldots, N\}$ are incorporated, resulting in the sample (or mini-batch) approximation function, where $|X_b| = N_b$ indicates a number of observation vectors included in the min-batch $$f_S(w) = \frac{1}{|X_b|} \sum_{i=1}^{|X_b|} f_i(w)$$

The class of SGD methods that create a solution sequence $\{w_k\}$, where k indicates an iteration umber, using only stochastic first-order approximations defined simply as $w_{k+1} = w_k - \alpha_k \nabla f_s(w_k)$ are commonly used where $\alpha_k$ is a control parameter called the learning rate. Gradient descent optimizations follow a direction of a slope of the surface created by the objective function downhill until a valley or saddle point is reached. A number of subsequent more sophisticated variations in this family have been proposed in the context of deep learning to enhance convergence and distribution properties such as ADAM, RAdam, Momentum, AdaHessian, Apollo, AdaBelief, etc.

Regardless of the variation, it has been observed that well-tuned SGD methods are highly effective at training large deep learning models with huge input datasets across diverse applications including image classification, object detection, machine translation, etc. SGD uses the first derivative of the cost function to decide the search direction. The step size is generally determined by predefined learning rate policies. Since the computation requirement of SGD is low, SGD is able to scale to train large models. The simplicity and scalability of SGD come with a cost though. SGD often requires extensive hyperparameter tuning to be effective, which increases the training time.

Because of this, QN methods are attractive in that they build and exploit second-order information in the background using the same inputs as SGD and nominal additional computational logistics. QN methods are a natural higher-level alternative to first-order methods, in that they seek to learn curvature information dynamically from past steps based on gradient information. Because QN methods require information similar to that of SGD calculated on mini-batches of data, QN methods can be applied in the same manner as SGD with little model specific coding required. Limited memory variants of QN methods scale to similar dimensions achievable by SGD. Potentially exploiting the curvature information, QN methods may be able to converge with fewer steps compared to first-order alternatives. Additionally, second-order methods parallelize similarly to modern first-order methods, as large batch sizes allow lower variance estimation of the Hessian, which may motivate training in a large batch size distributed setting.

The most popular existing QN update strategy is the L-BFGS method. At each iteration, L-BFGS uses gradients to approximate an inverse Hessian matrix and to compute the search direction and step size. Compared to SGD, L-BFGS requires fewer iterations to converge and usually needs minimal hyperparameter tuning. However, L-BFGS is more expensive per iteration and may become trapped in local minima with inferior objective values.

Stochastic L-BFGS uses a mini-batch of input data to evaluate the objective function each iteration. For classic stochastic L-BFGS, the gradient pairs used to update the Hessian approximation are from different mini-batches meaning the Hessian approximation can be inaccurate and unstable. To overcome this problem, one more evaluation at each mini-batch can be computed so that the gradient pairs are from the same mini-batches as described in N. N. Schraudolph et al., *A stochastic quasi-newton method for online convex optimization*, Proceedings of the 10th International Conference on Artificial Intelligence and Statistics, Vol. 7, 436-443 (2007). However, this approach doubles the computation cost of the Hessian approximation update. A batch overlap method as described in A. S. Berahas et al, *A multi-batch I-bfgs method for machine learning*, Advances in Neural Information Processing Systems, Vol. 29, 1055-1063 (2016) reduces the additional computation, but requires additional memory storage and computational logistics. An efficient stochastic L-BFGS method is further described in U.S. Pat. No. 10,769,528 that issued Sep. 8, 2020 to the assignee of the present application.

When training deep learning models, the solution process using linear search can become stuck in local minimal solutions that may be located far from a true optimal value. As a QN method, L-BFGS employs a line search procedure to compute the step size at each iteration. Generally, the line search of L-BFGS employs either a backtracking line search or the Wolfe conditions to update the step size. A typical backtracking line search starts with a relatively large estimated step size to move along a search direction, and gradually backtracks the step size until the desired objective function value decrease is achieved. Because backtracking needs extra function evaluations, this procedure can become expensive when the objective function evaluation is not computationally cheap. Again, a strict linear search requirement can also cause L-BFGS to become trapped at a local minimum and terminate with a large training error.

Given a search direction $p_k$, standard line-search methods require that the corresponding step size $\delta_k$ satisfy a sufficient-decrease condition, such as the Armijo-Goldstein condition that requires $$f(w_k+\delta_k p_k) < f(w_k) + c\delta_k p_k^T \nabla f(w_k)$$

where $w_k$ is a current weight vector, and $c \in (0,1)$ is a control parameter. Such a condition ensures the reduction in $f(w_k)$ is proportional to that of the first-order Taylor expansion of $f(w_k)$ centered at $w_k$. Stochastic algorithms offer a new challenge to classical line-search methods because $f(w_k)$ is not fully evaluated and is instead approximated by a mini-batch sample function $$f_s(w_k) \approx f(w_k)$$

and further may be non-smooth due to discontinuous operations like batch normalization. Thus, classical sufficient decrease functions can result in very small steps, stalled progress, and a failed line search.

Stochastic QN (SQN) methods typically strive to mimic the learning-rate policies used by SGD and often skip line-searches that are typically used in non-stochastic variants. For this reason, a relatively recent alternative to line-search and trust-region approaches known as cubic regularization is a promising alternative that minimizes $$\min_{s \in \mathbb{R}^m} m_k(s) = f(w_k) + s^T g_k + \frac{1}{2} s^T B_k s + \frac{1}{3} \sigma_k \|s\|^3,$$

where $s_k = w_k - w_{k-1}$ is a step or direction vector, k is the iteration index, $m_k$ indicates the SQN cubic model, m is a size of the gradient vector that is the total number of neurons across all layers, $f(w_k)$ is the objective function to minimize, T indicates a transpose, $g_k$ is a gradient vector where $g_k = \nabla f(w_k)$, $B_k$ is a curvature approximation matrix derived using a limited memory symmetric rank-1 (L-SR1) method, $\sigma_k$ is an iteratively selected regularization parameter, and $\| \|$ indicates a Euclidean norm computation. Each iteration, $B_k s_k = y_k$, where $y_k = g_k - g_{k-1}$.

If $\sigma_k > L_k$, where $L_k$ is the Lipschitz constant for $f(x_k+s_k) - f(x_k) < m_k(s_k) - f(x_k)$, any reduction achieved in $m_k(s_k)$ is likewise achieved in $f(x_k)$. Thus, if a universal (or locally applicable) $L_k$ can be learned that works for all batches, line-search and trust-region criteria are no longer required. For illustration, L-SR1 methods are described in a paper by Aditya Ranganath, Mukesh Singhal, and Roummel Marcia titled *L-SR1 adaptive regularization by cubics for deep learning* published in 2022 and in a paper by Johannes J. Brust, Jennifer B. Erway, and Roummel F. Marcia titled *On solving L-SR1 trust-region subproblems* published in Computational Optimization and Applications volume 66 at pages 245-266 in 2017. An L-SR1 based method is further described in U.S. Pat. No. 10,949,747 that issued Mar. 16, 2021 to the assignee of the present application.

A neural network model training application 122 implements a matrix-free solver that is tractable even when m is very large resulting in up to a 100× speedup in computation time. Neural network model training application 122 exactly solves the cubic regularization problem for any limited memory QN approximation that yields itself to an efficient eigen-decomposition, such as L-BFGS and L-SR1, as described further below.

Referring to FIG. 1, a block diagram of a neural network model training device 100 is shown in accordance with an illustrative embodiment. Neural network model training device 100 may include an input interface 102, an output interface 104, a communication interface 106, a non-transitory computer-readable medium 108, a processor 110, neural network model training application 122, training dataset 124, and a neural network model description 126. Neural network model training application 122 provides an SQN algorithm with cubic regularization. Fewer, different, and/or additional components may be incorporated into neural network model training device 100.

Input interface 102 provides an interface for receiving information from the user or another device for entry into neural network model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into neural network model training device 100 or to make selections presented in a user interface displayed on display 116.

The same interface may support both input interface 102 and output interface 104. For example, display 116 comprising a touch screen provides a mechanism for user input and for presentation of output to the user. Neural network model training device 100 may have one or more input interfaces that use the same or a different input interface technology. The input interface technology further may be accessible by neural network model training device 100 through communication interface 106.

Output interface 104 provides an interface for outputting information for review by a user of neural network model training device 100 and/or for use by another application or device. For example, output interface 104 may interface with various output technologies including, but not limited to, display 116, a speaker 118, a printer 120, etc. Neural network model training device 100 may have one or more output interfaces that use the same or a different output interface technology. The output interface technology further may be accessible by neural network model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Neural network model training device 100 may have one or more communication interfaces that use the same or a different communication interface technology. For example, neural network model training device 100 may support communication using an Ethernet port, a Bluetooth antenna, a telephone jack, a USB port, etc. Data and/or messages may be transferred between neural network model training device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Neural network model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Neural network model training device 100 also may have one or more drives that support the loading of a memory media such as a CD, DVD, an external hard drive, etc. One or more external hard drives further may be connected to neural network model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Neural network model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Neural network model training application 122 performs operations associated with defining neural network model description 126 from data stored in training dataset 124. Neural network model description 126 may be used to predict a characteristic value for data stored training dataset 124 or in a second dataset 524 (shown referring to FIG. 5). The characteristic value may include one or more values that may be a probability that the associated observation vector has a predefined characteristic associated with each probability. Some or all of the operations described herein may be embodied in neural network model training application 122. The operations may be implemented using hardware, firmware, software, or any combination of these methods.

Referring to the example embodiment of FIG. 1, neural network model training application 122 is implemented in software (comprised of computer-readable and/or computer-executable instructions) stored in computer-readable medium 108 and accessible by processor 110 for execution of the instructions that embody the operations of neural network model training application 122. Neural network model training application 122 may be written using one or more programming languages, assembly languages, scripting languages, etc. Neural network model training application 122 may be integrated with other analytic tools. As an example, neural network model training application 122 may be part of an integrated data analytics software application and/or software architecture such as that offered by SAS Institute Inc. of Cary, N.C., USA. Merely for illustration, neural network model training application 122 may be implemented using or integrated with one or more SAS software tools such as JMP®, Base SAS, SAS® Enterprise Miner™ SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/ORO, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Neural network model training application 122 may be implemented as a Web application. For example, neural network model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. In an alternative embodiment, training dataset 124 may be transposed. The plurality of variables defines a vector $x_i$ for each observation vector i=1, 2, ..., N, where N is a number of the observation vectors included in training dataset 124. Training dataset 124 may include additional variables that are not included in the plurality of variables. One or more variables of the plurality of variables may describe a characteristic of a physical object. For example, if training dataset 124 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in training dataset 124 for analysis and processing or streamed to neural network model training device 100 as it is generated. Training dataset 124 may include data captured as a function of time for one or more physical objects. The data stored in training dataset 124 may be captured at different time points periodically, intermittently, when an event occurs, etc. Training dataset 124 may include data captured at a high data rate such as 200 or more observation vectors per second for one or more physical objects. One or more columns of training dataset 124 may include a time and/or date value. Training dataset 124 may include data captured under normal and abnormal operating conditions of the physical object.

The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Training dataset 124 may be stored on computer-readable medium 108 or on one or more computer-readable media of distributed computing system 130 and accessed by neural network model training device 100 using communication interface 106, input interface 102, and/or output interface 104. Training dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Training dataset 124 may be stored using various data structures as known to those skilled in the art including one or more files of a file system, a relational database, one or more tables of a system of tables, a structured query language database, etc. on neural network model training device 100 or on distributed computing system 130. Neural network model training device 100 may coordinate access to training dataset 124 that is distributed across distributed computing system 130 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS Viya open, cloud-ready, in-memory architecture also may be used as an analytic platform to enable multiple users to concurrently access data stored in training dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Referring to FIGS. 2A to 2C, 3A, 3B, 4A, and 4B example operations associated with neural network model training application 122 are described when training dataset 124 is stored on neural network model training device 100. Additional, fewer, or different operations may be performed depending on the embodiment of neural network model training application 122. The order of presentation of the operations of FIGS. 2A to 2C, 3A, 3B, 4A, and 4B is not intended to be limiting. Some of the operations may not be performed in some embodiments. Although some of the operational flows are presented in sequence, the various operations may be performed in various repetitions and/or in other orders than those that are illustrated. For example, a user may execute neural network model training application 122, which causes presentation of a first user interface window, which may include a plurality of menus and selectors such as drop-down menus, buttons, text boxes, hyperlinks, etc. associated with neural network model training application 122 as understood by a person of skill in the art. The plurality of menus and selectors may be accessed in various orders. An indicator may indicate one or more user selections from a user interface, one or more data entries into a data field of the user interface such as a text box or a control window, one or more data items read from computer-readable medium 108, or otherwise defined with one or more default values, etc. that are received as an input by neural network model training application 122. The operations of neural network model training application 122 further may be performed in parallel using a plurality of threads and/or a plurality of worker computing devices.

Figure 2A:
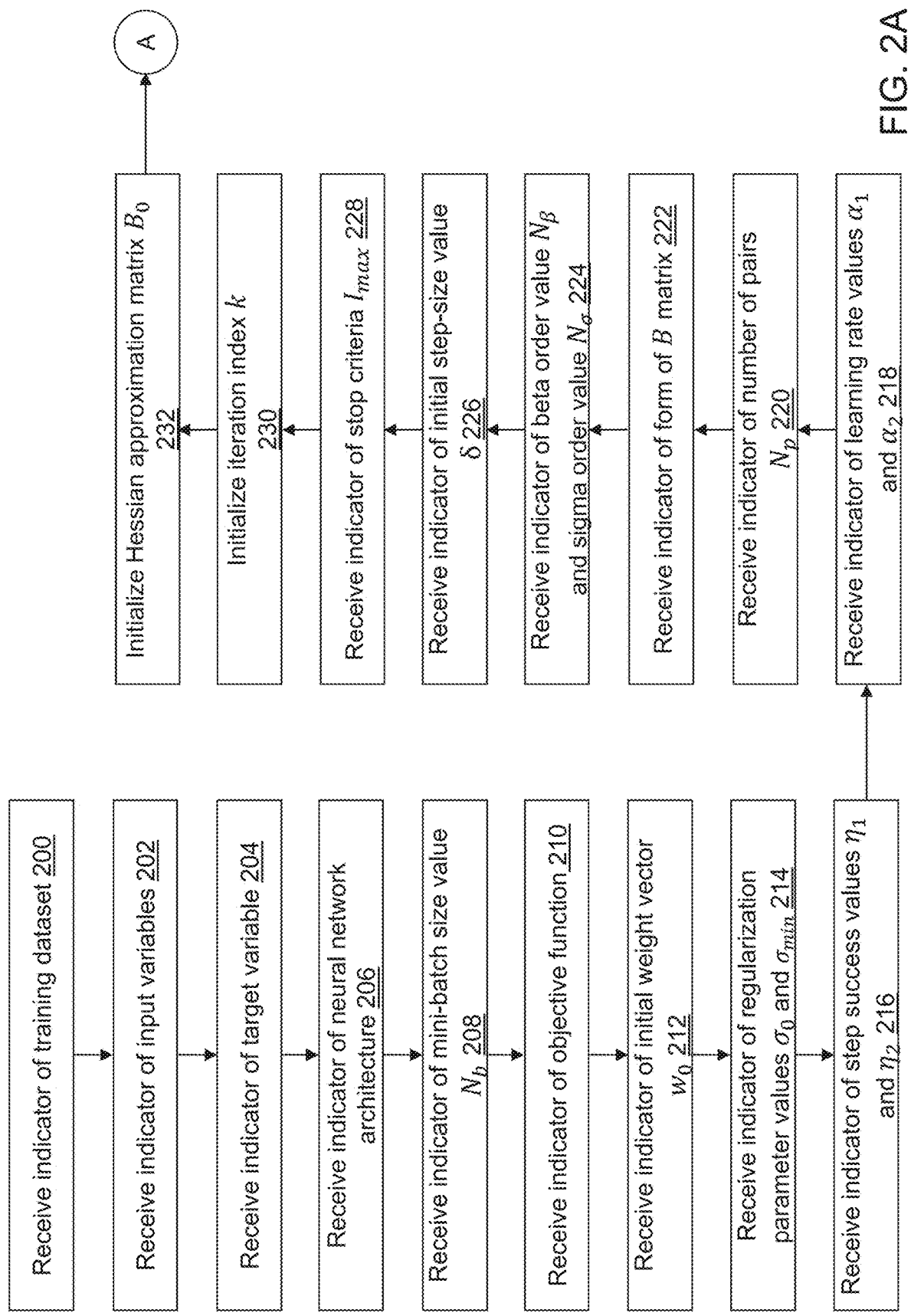
FIGS. 2A, 2B, 2C, 3A, 3B, 4A, and 4B depict a flow diagram illustrating examples of operations performed by a neural network model training application of the neural network model training device of FIG. 1 in accordance with an illustrative embodiment.

Referring to FIG. 2A, in an operation 200, a first indicator may be received that indicates training dataset 124. For example, the first indicator indicates a location and a name of training dataset 124. As an example, the first indicator may be received by neural network model training application 122 after selection from a user interface window or after entry by a user into a user interface window. In an alternative embodiment, training dataset 124 may not be selectable. For example, a most recently created dataset may be used automatically.

In an operation 202, a second indicator may be received that indicates a plurality of variables or features to include in training a neural network model using training dataset 124. For example, the second indicator may indicate a plurality of column numbers or a plurality of column names. As another option, all of the columns except a last column may be used by default. Each observation vector $x_i$, i=1, ..., N read from training dataset 124 may include a value for each variable of the plurality of variables to define d dimensions or features. Training dataset 124 includes a set of observation vectors X=[$x_{j,i}$], i=1, ..., d, j=1, ..., N. When a value for a variable of the plurality of variables is missing, the observation vector may not be included in the number of observation vectors N, a value may be computed for the missing variable, for example, based on neighbor values, etc. Training dataset 124 may be partitioned or otherwise divided into training, validation, and/or test datasets as part of training a neural network.

In an operation 204, a third indicator may be received that indicates a target variable (column) associated with each observation vector included in training dataset 124 to define a target variable vector $t_i$, i=1, ..., N. The target variable may be a label for the associated observation vector. For example, the label may indicate a characteristic determined from the observation vector. For example, the third indicator indicates a variable to use by name, column number, etc. In an alternative embodiment, the third indicator may not be received. For example, the last variable in training dataset 124 may be used automatically.

In an operation 206, a fourth indicator indicates an architecture of the neural network to be trained to predict a value for the target variable. The fourth indicator may be received by neural network model training application 122 from a user interface window or after entry by a user into a user interface window. A default value for the architecture may further be stored, for example, in computer-readable medium 108. For illustration, the architecture defines a plurality of layers and their connectivity including a type of each layer. Illustrative layers include an input layer, a convolution layer, a pooling layer, an output layer, etc. One or more hyperparameters may be defined for each layer that may vary based on the type of each layer. For example, an activation function, a number of neurons, a number of groups, a dropout rate, a height and/or a width of a convolution window, a number of filters, an initialization method for filter weights, width and height padding dimensions, a number of categories or labels, a detection threshold, etc. may be defined as hyperparameters for training the neural network. The architecture may define a convolutional neural network, a deep, fully connected neural network, and/or a recurrent neural network. An automatic tuning method (autotune option) may be specified with one or more values or ranges of values to evaluate for each hyperparameter. The automatic tuning process may be used to identify the best settings for the hyperparameters though the hyperparameters may optionally be selected as an input option by a user.

Figure 7:
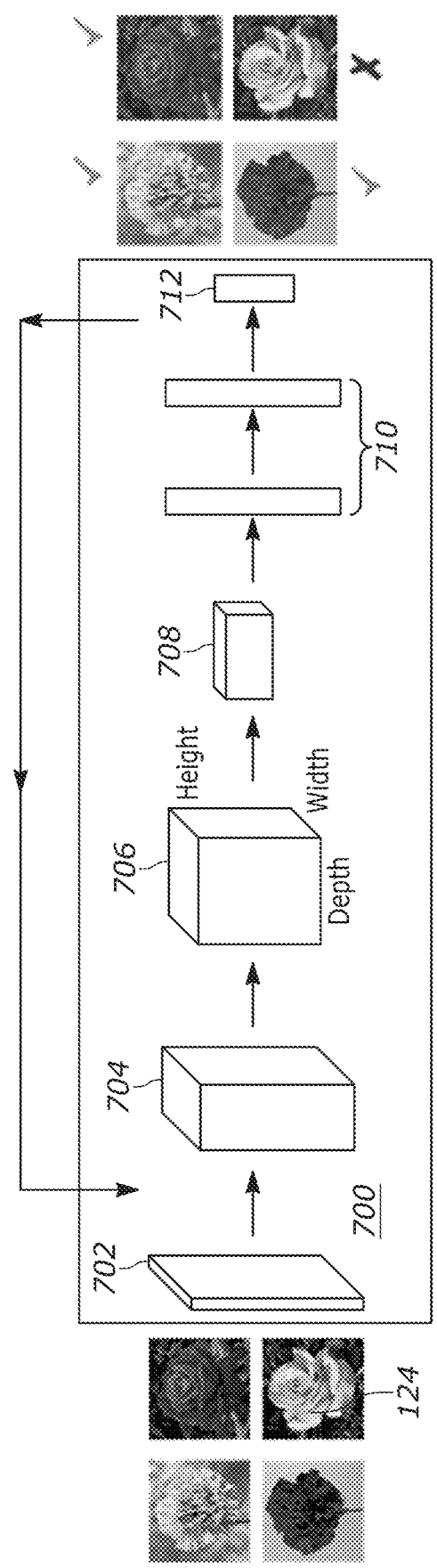
FIG. 7 depicts an illustrative neural network training process in accordance with an illustrative embodiment.

Referring to FIG. 7, an architecture 700 is shown in accordance with an illustrative embodiment. In an illustrative embodiment, training dataset 124 includes images of flowers though training dataset may include other types of data. Architecture 700 includes an input layer 702 that provides input to a first convolution layer 704 that provides input to a second convolution layer 706 that provides input to a pooling layer 708 that provides input to a fully connected layer 710 that provides input to an output layer 712 that indicates a type of flower for each image. The flower type prediction may be correct or in error. A measure of the error in terms of an objective function is fed back to drive the adjustment of weights associated with each neuron of architecture 700. Gradients may be computed each iteration through a back propagation through architecture and used to drive an adjustment of weights associated with each neuron of architecture 700 as described further below.

In an operation 208, a fifth indicator of a mini-batch size value $N_b$ may be received. In an alternative embodiment, the fifth indicator may not be received. For example, a default value may be stored, for example, in computer-readable medium 108 and used automatically. In another alternative embodiment, the value of the mini-batch size value may not be selectable. Instead, a fixed, predefined value may be used. For illustration, a default value for the mini-batch size value may be $N_b$=4 though other values may be used. The mini-batch size value indicates a mini-batch size used to repeatedly select observation vectors from training dataset 124 as part of the training of the neural network defined in operation 206.

In an operation 210, a sixth indicator of an objective function $f(w)$ used to compute a model error or loss may be received. In an alternative embodiment, the sixth indicator may not be received. For example, a default objective function may be stored, for example, in computer-readable medium 108 and used automatically. In another alternative embodiment, the objective function may not be selectable. Instead, a fixed, predefined objective function may be used. For illustration, a default objective function may be $$f(w) = \frac{1}{N}\sum_{i=0}^{N} L(w; x_i, t_i) + \lambda_1 \|w\|_1 + \frac{\lambda_2}{2}\|w\|_2^2$$

where $L(w; x_i, y_i)$ may be the loss associated with observation i having observation vector $x_i$ with the classification value $t_i$, $\lambda_1$ is an L1 regularization parameter, and $\lambda_2$ is an L2 regularization parameter, though other functions may be used. $\lambda_1$ and $\lambda_2$ are greater than or equal to zero. Default values for $\lambda_1$ and $\lambda_2$ may be zero.

In an operation 212, a seventh indicator of an initial weight vector $w_0$ or a methodology by which the initial weight vector $w_0$ is defined may be received. In an alternative embodiment, the eighth indicator may not be received. For example, a default value may be stored, for example, in computer-readable medium 108 and used automatically. In another alternative embodiment, the initial weight vector $w_0$ may not be definable. Instead, a fixed, predefined vector may be used. In an illustrative embodiment, the methodology may be to read values from a weight vector input file indicated by the seventh indicator or by default.

In an operation 214, an eighth indicator of an initial regularization parameter value $\sigma_0$ and of a minimum regularization parameter value $\sigma_{min}$ may be received. In an alternative embodiment, the eighth indicator may not be received. For example, a default value may be stored, for example, in computer-readable medium 108 and used automatically. In another alternative embodiment, the value of the initial regularization parameter value $\sigma_0$ and of the minimum regularization parameter value $\sigma_{min}$ may not be selectable. Instead, fixed, predefined values may be used. For illustration, a default value of the initial regularization parameter value $\sigma_0$ may be one and a default value of the minimum regularization parameter value $\sigma_{min}$ may be 1 e−4 though other values may be used.

In an operation 216, a ninth indicator of a first step success value $\eta_1$ and of a second step success value $\eta_2$ may be received. In an alternative embodiment, the ninth indicator may not be received. For example, a default value may be stored, for example, in computer-readable medium 108 and used automatically. In another alternative embodiment, the value of the first step success value $\eta_1$ and of the second step success value $\eta_2$ may not be selectable. Instead, fixed, predefined values may be used. For illustration, a default value of the first step success value $\eta_1$ may be 0.1 and a default value of the second step success value $\eta_2$ may be 0.75 though other values may be used.

In an operation 218, a tenth indicator of a first learning rate value $\alpha_1$ and of a second learning rate value $\alpha_2$ may be received. In an alternative embodiment, the tenth indicator may not be received. For example, a default value may be stored, for example, in computer-readable medium 108 and used automatically. In another alternative embodiment, the value of the first learning rate value $\alpha_1$ and of the second learning rate value $\alpha_2$ may not be selectable. Instead, fixed, predefined values may be used. For illustration, a default value of the first learning rate value $\alpha_1$ may be 0.99 and a default value of the second learning rate value $\alpha_2$ may be 1e−3 though other values may be used.

In an operation 220, an eleventh indicator of a number of pairs $N_p$ may be received. In an alternative embodiment, the eleventh indicator may not be received. For example, a default value may be stored, for example, in computer-readable medium 108 and used automatically. In another alternative embodiment, the value of the number of pairs $N_p$ may not be selectable. Instead, fixed, predefined values may be used. For illustration, a default value of the number of pairs $N_p$ may be 7 though other values may be used. For example, the number of pairs $N_p$ may be between 3 and 50. The number of pairs $N_p$ indicate the number of values maintained in matrices S and Y as described further below.

In an operation 222, a twelfth indicator of a form of a Hessian approximation matrix B may be received. In an alternative embodiment, the twelfth indicator may not be received. For example, a default form may be stored, for example, in computer-readable medium 108 and used automatically. In another alternative embodiment, the form may not be definable. Instead, a fixed, predefined form may be used such as a diagonal matrix. Illustrative options for the form of the Hessian approximation matrix B may be 'diagonal' or 'LQN', where LQN indicates limited quasi-newton. For illustration, when the Hessian approximation matrix B is computed using an SGD algorithm, an ADAM algorithm, a Momentum algorithm, an Apollo algorithm, etc., the form of the Hessian approximation matrix B is either 'diagonal' or 'LQN'. For illustration, when the Hessian approximation matrix B is computed using an RAdam algorithm, an AdaBelief algorithm, etc., the form of the Hessian approximation matrix B is 'diagonal'. For illustration, when the Hessian approximation matrix B is computed using an AdaHessian algorithm, an L-SR1 algorithm, an L-BFGS algorithm, etc., the form of the Hessian approximation matrix B may be 'LQN'. Illustrative algorithms for computing the Hessian approximation matrix B are described in Sutskever, Ilya, et al. "On the importance of initialization and momentum in deep learning", International conference on machine learning, PMLR, 2013; Liu, Liyuan, et al. "On the variance of the adaptive learning rate and beyond" arXiv preprint arXiv:1908.03265 (2019); Yao, Zhewei, et al. "Adahessian: An adaptive second order optimizer for machine learning" Proceedings of the AAAI Conference on Artificial Intelligence, vol. 35, no. 12, 2021; Zhuang, Juntang, et al. "Adabelief optimizer: Adapting stepsizes by the belief in observed gradients" Advances in neural information processing systems 33 (2020): 18795-18806; and Dennis, Jr, John E., and Jorge J. Moré, "Quasi-Newton methods, motivation and theory" SIAM review 19.1 (1977): 46-89.

In an operation 224, a thirteenth indicator of a beta order value $N_\beta$ and of a sigma order value $N_\sigma$ may be received. In an alternative embodiment, the thirteenth indicator may not be received. For example, a default value may be stored, for example, in computer-readable medium 108 and used automatically. In another alternative embodiment, the value of the beta order value $N_\beta$ and of the sigma order value $N_\sigma$ may not be selectable. Instead, fixed, predefined values may be used. In an illustrative embodiment, the value of the beta order value $N_\beta$ may be the same as the sigma order value $N_\sigma$ such that a single value is used. For illustration, a default value of the beta order value $N_\beta$ may be 10 and a default value of the sigma order value $N_\sigma$ may be 10 though other values may be used. The beta order value $N_\beta$ and the sigma order value $N_\sigma$ may be defined based on the form of the Hessian approximation matrix B. For example, in an illustrative embodiment, $N_\beta = N_\sigma \ll m$ when the form is diagonal, and $N_\beta = N_\sigma \leq N_p + 1$, otherwise.

In an operation 226, a fourteenth indicator of an initial step-size value $\delta$ may be received. In an alternative embodiment, the fourteenth indicator may not be received. For example, a default value may be stored, for example, in computer-readable medium 108 and used automatically. In another alternative embodiment, the value of the initial step-size value $\delta$ may not be selectable. Instead, a fixed, predefined value may be used. For illustration, a default value of the initial step-size value $\delta$ may be a large value such as 1e20.

In an operation 228, a fifteenth indicator of an optimization stop criteria such as a maximum number of iterations $I_{max}$ may be received. In an alternative embodiment, the fifteenth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 250 though other values may be used. The maximum number of iterations $I_{max}$ indicates how many iterations are performed as part of the training of the neural network defined in operation 206 before training is stopped. Training may also be stopped when a convergence criterion is achieved that may be specified by the fourth indicator or otherwise provided as an input to neural network model training application 122. In alternative embodiments, a maximum computing time may be specified in addition to or instead of the maximum number of iterations $I_{max}$ and used in a similar manner to stop the training process when the maximum computing time is reached.

In an operation 230, an iteration index k is initialized, for example, as k=1.

Figure 2B:
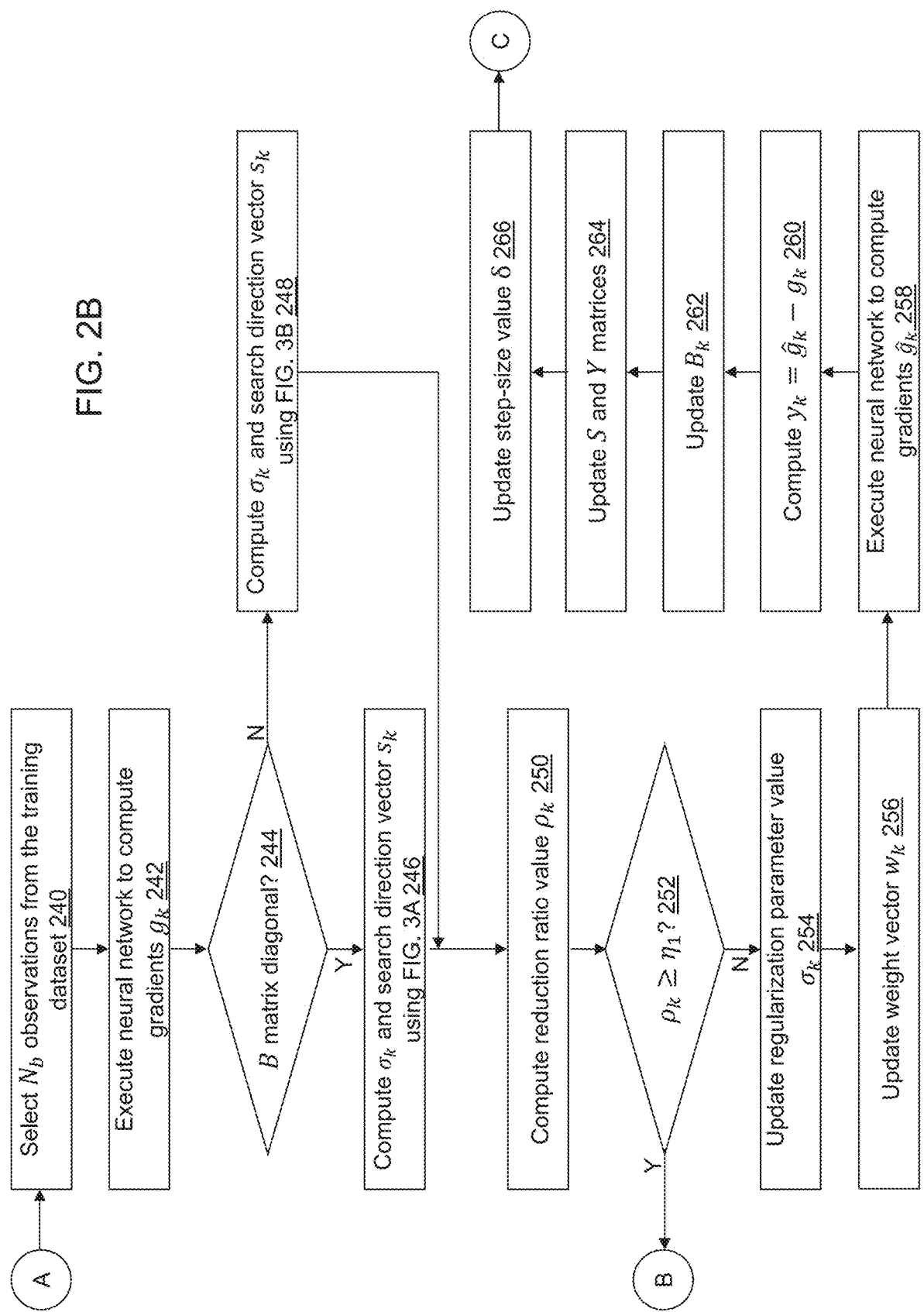

In an operation 232, an initial Hessian approximation matrix $B_0$ is initialized, and processing continues in an operation 240 shown referring to FIG. 2B. For example, $B_0$ is initialized using $B_0 = I$, where I is an identity matrix having dimension $N_p \times m$, $N_p$ is the number of pairs indicated in operation 220, and m is a total number of neurons across all layers for which a gradient is computed.

Referring to FIG. 2B, in operation 240, $N_b$ observation vectors are selected from training dataset 124 to define a mini-batch of observations, where $N_b$ is the mini-batch size value indicated in operation 208. The observation vectors may be randomly selected from training dataset 124 with replacement in an illustrative embodiment.

In an operation 242, the neural network defined by the architecture specified in operation 206 is executed with the mini-batch of observations and the weight vector $w_{k-1}$ to compute gradient vector $g_k$ that includes values for each neuron of the neural network.

In an operation 244, a determination is made concerning the form of the B matrix indicated in operation 224. When the form of the B matrix is diagonal, processing continues in an operation 246. When the form of the B matrix is not diagonal, processing continues in an operation 248.

Figure 3A:
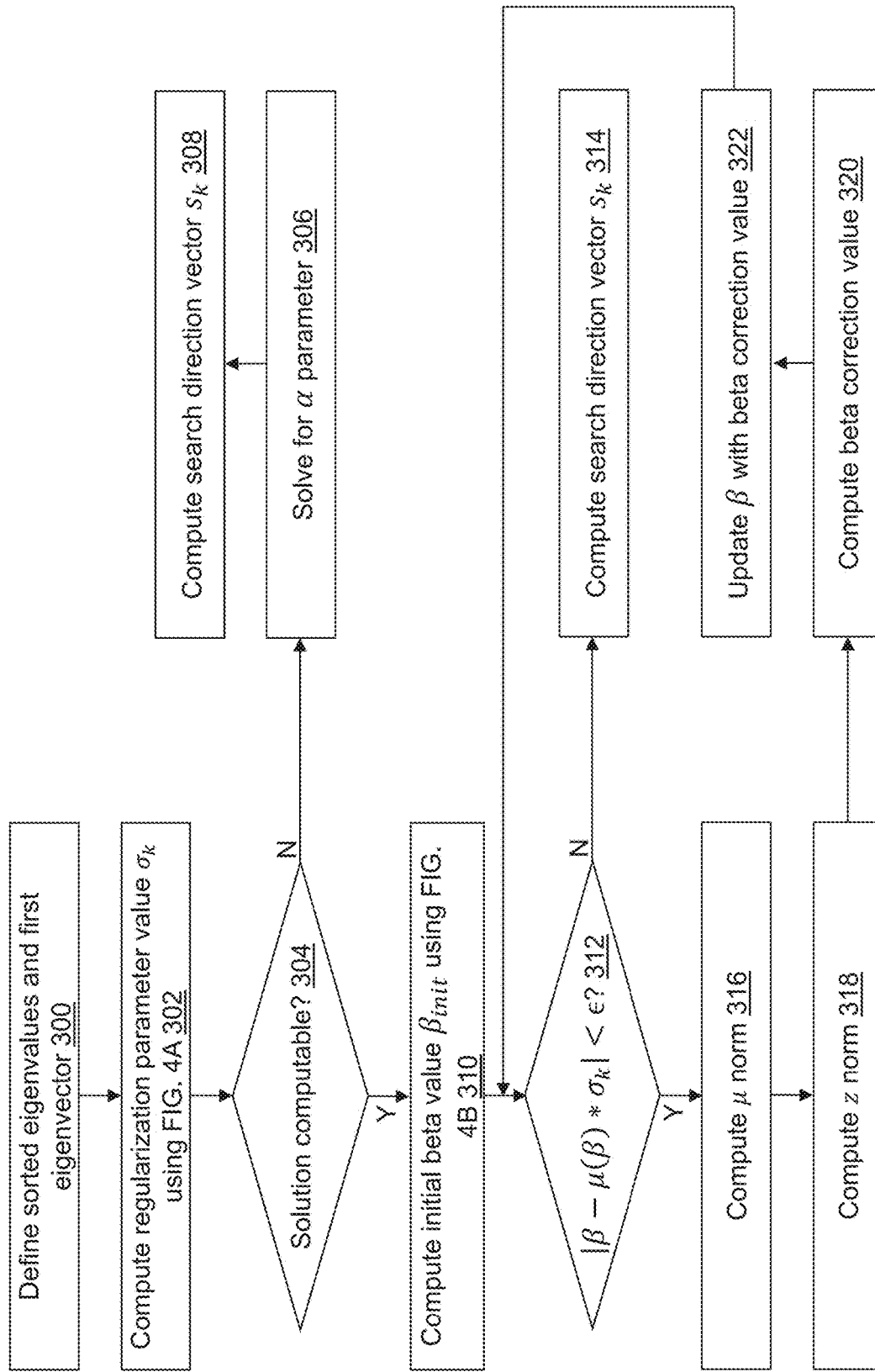

In operation 246, a search direction vector $s_k$ and a regularization parameter value $\sigma_k$ are computed using the operations described in FIG. 3A, and processing continues in an operation 250.

Figure 3B:
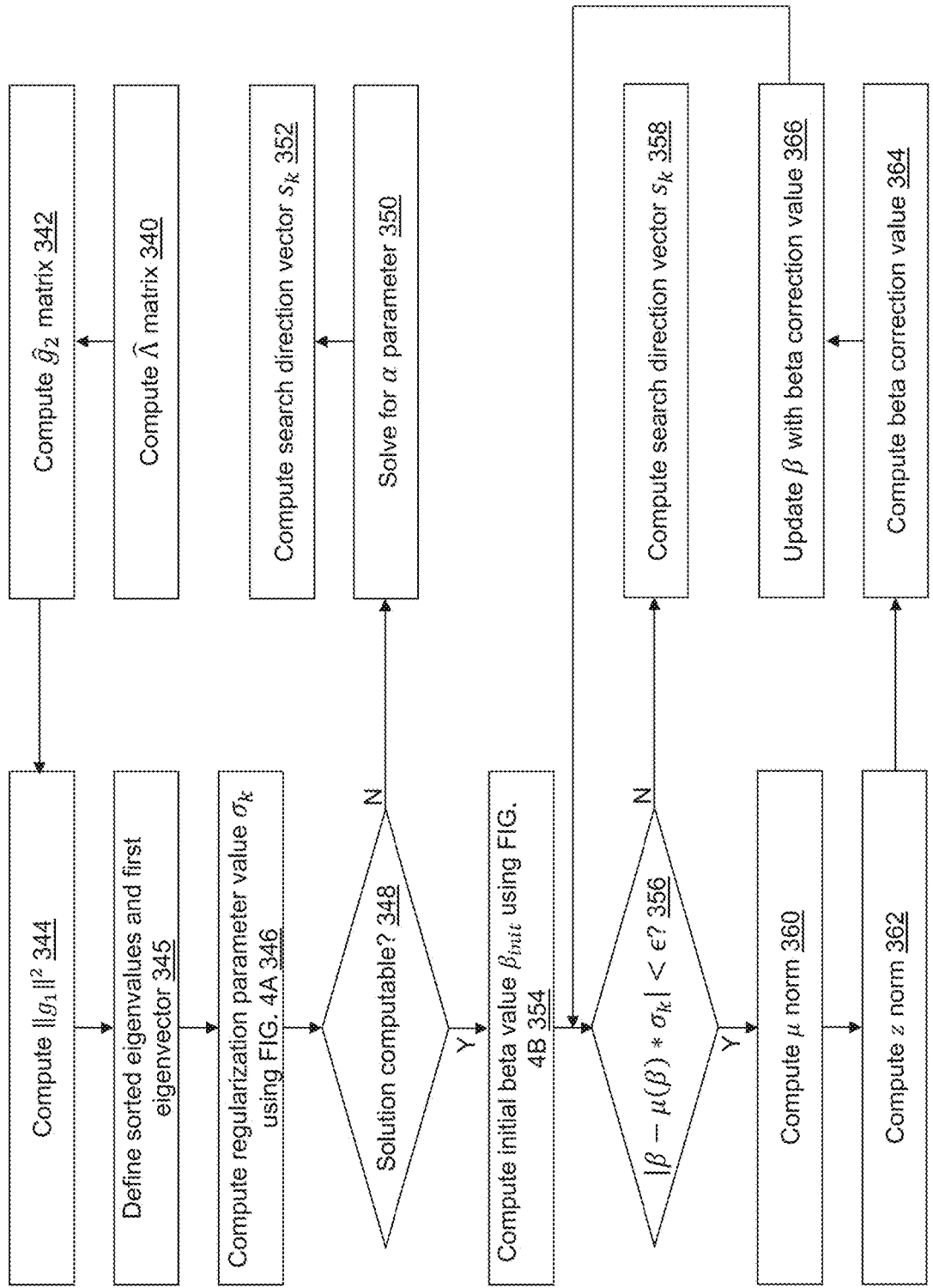

In operation 248, the search direction vector $s_k$ and the regularization parameter value $\sigma_k$ are computed using the operations described in FIG. 3B, and processing continues in operation 250.

In operation 250, a reduction ratio value $\rho_k$ is computed, for example, using $$\rho_k = \frac{f(w_k) - f(w_k + s_k)}{f(w_k) - m_k(s_k)},$$

where $f(w_k) - f(w_k + s_k)$ is the decrease in the objective function value, and $f(w_k) - m_k(s_k)$ is the predicted decrease in the objective function value. $f(w_k)$ is the objective function value computed by executing the neural network with the mini-batch of observations and the weight vector $w_k$ in operation 242, and $f(w_k + s_k)$ is a second objective function value computed by executing the neural network with the mini-batch of observations and the weight vector $w_k + s_k$. $m_k(s_k)$ is computed using $$m_k(s_k) = f(w_k) + s_k^T g_k + \frac{1}{2} s_k^T B_{k-1} s_k + \frac{1}{3} \sigma_k \|s_k\|^3.$$

In an operation 252, a determination is made concerning whether $\rho_k \geq \eta_1$, where $\eta_1$ is the first step success value indicated in operation 216. When $\rho_k \geq \eta_1$, processing continues in an operation 270 shown referring to FIG. 2C. When $\rho_k < \eta_1$, processing continues in an operation 254.

In operation 254, the regularization parameter value $\sigma_k$ is updated, for example, using $\sigma_k = 2\sigma_{k-1}$.

In an operation 256, the weight vector is updated, for example, using $w_k = w_{k-1} - \alpha_2 g_k$, where $\alpha_2$ is the second learning rate value indicated in operation 218.

In an operation 258, the neural network defined by the architecture specified in operation 206 is executed with the mini-batch of observations and the weight vector $w_k$ to compute gradient vector $\hat{g}_k$ that includes values for each neuron of the neural network, where $\hat{g}_k$ may be referred to as a post-iteration gradient vector.

In an operation 260, the gradient delta vector $y_k$ is computed, for example, using $y_k = \hat{g}_k - g_k$.

In an operation 262, the Hessian approximation matrix $B_k$ is updated, for example, using $$B_k = B_{k-1} + \frac{(y_k - B_{k-1}(-\alpha_2 g_k))(y_k - B_{k-1}(-\alpha_2 g_k))^T}{(-\alpha_2 g_k)^T (y_k - B_{k-1}(-\alpha_2 g_k))}.$$

In an operation 264, $-\alpha_2 g_k$ is added as a new column in a matrix S, $y_k$ is added as a new column in a matrix Y. A first column is removed from matrices S and Y before adding each new column when a number of columns exceeds $N_p$, such that matrices S and Y each have dimension $N_p$, where $N_p$ is the number of pairs indicated in operation 220.

Figure 2C:
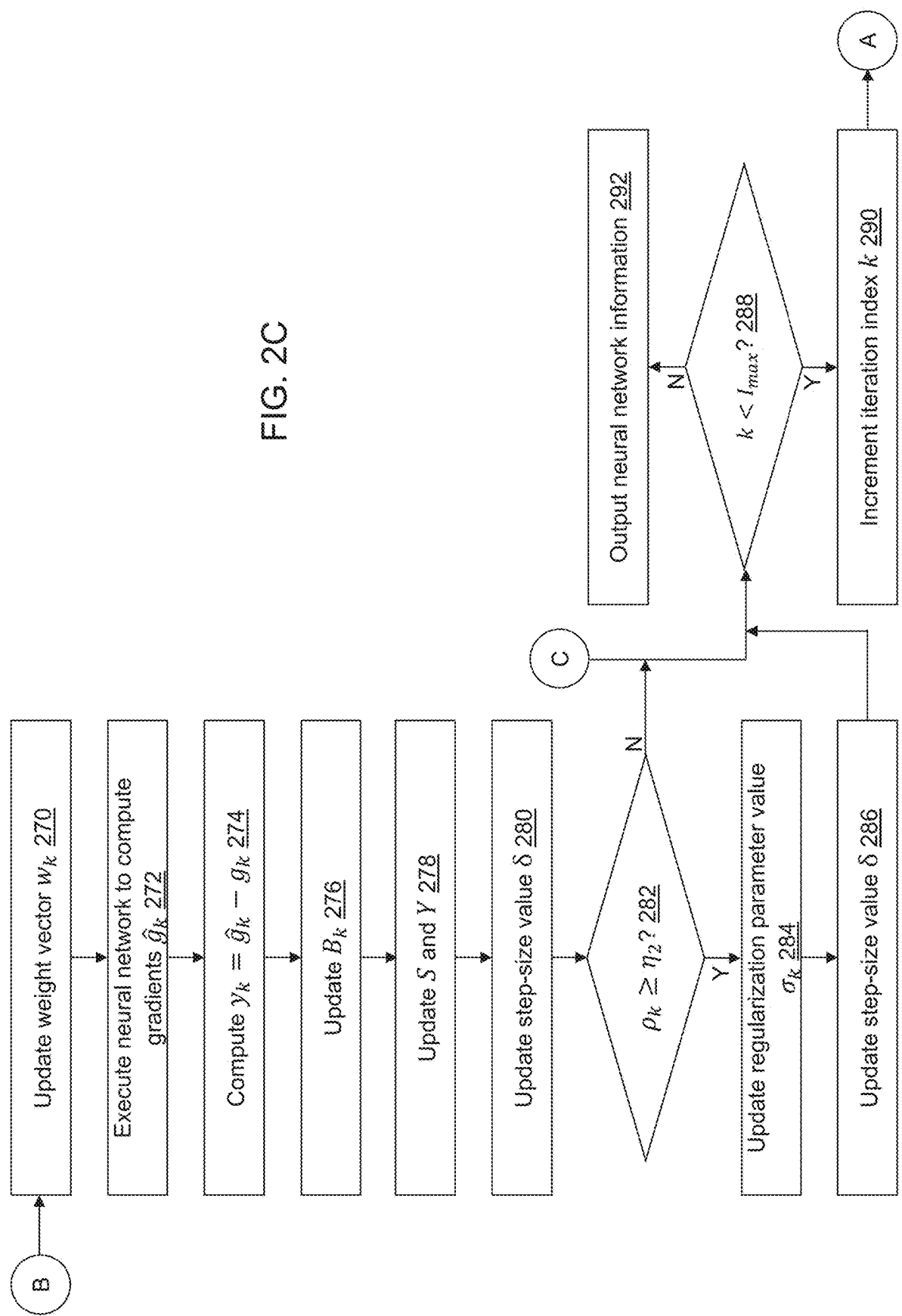

In an operation 266, the step-size value $\delta$ is updated, for example, using $\delta = \|s_k\|/2$, and processing continues in an operation 288 shown referring to FIG. 2C.

Referring to FIG. 2C, in an operation 270, the weight vector is updated, for example, using $w_k = w_{k-1} + \alpha_1 s_k$, where $\alpha_1$ is the first learning rate value indicated in operation 218.

In an operation 272, the neural network defined by the architecture specified in operation 206 is executed with the mini-batch of observations and the weight vector $w_k$ to compute gradient vector $\hat{g}_k$.

In an operation 274, the gradient delta vector $y_k$ is computed, for example, using $y_k = \hat{g}_k - g_k$.

In an operation 276, the Hessian approximation matrix $B_k$ is updated, for example, using $$B_k = B_{k-1} + \frac{(y_k - B_{k-1} \alpha_1 s_k)(y_k - B_{k-1} \alpha_1 s_k)^T}{(\alpha_1 s_k)^T (y_k - B_{k-1} \alpha_1 s_k)}.$$

In an operation 278, $\alpha_1 s_k$ is added as a new column in a matrix S, $y_k$ is added as a new column in a matrix Y. A first column is removed from matrices S and Y before adding each new column when a number of columns exceeds $N_p$, such that matrices S and Y each have dimension $N_p$.

In an operation 280, the step-size value $\delta$ is updated, for example, using $\delta = \|s_k\|$.

In an operation 282, a determination is made concerning whether $\rho_k \geq \eta_2$, where $\eta_2$ is the second step success value indicated in operation 216. When $\rho_k \geq \eta_2$, processing continues in an operation 284. When $\rho_k < \eta_2$, processing continues in operation 288.

In operation 284, the regularization parameter value $\sigma_k$ is updated, for example, using $$\sigma_k = \max\left(\frac{\sigma_{k-1}}{2}, \sigma_{min}\right),$$

where $\sigma_{min}$ is the minimum regularization parameter value indicated in operation 214.

In an operation 286, the step-size value $\delta$ is updated, for example, using $\delta = 2\|s_k\|$.

In operation 288, a determination is made concerning whether $k < I_{max}$, where $I_{max}$ is the stop criteria indicated in operation 228. When $k < I_{max}$, processing continues in an operation 290 to perform another iteration. When $k \geq I_{max}$, processing continues in an operation 292. The determination may further, or in the alternative, be based on a maximum computing time and/or a minimum convergence parameter value where a convergence parameter value may be computed for example, based on various parameters or differences between the value of the various parameters for the most recent pair of iterations. Illustrative parameters are $y_k$, $w_k$, $g_k$, etc. For example, the stop criteria may occur when $\text{norm}(g_k)$ remains small or the average loss starts to increases or the changes are small, etc.

In operation 290, the iteration index k is incremented, for example, using $k = k+1$, and processing continues in operation 240 to perform another iteration.

In operation 292, the neural network model description is output. For example, the neural network model description may be output to neural network model description 126. The neural network model description may include the neural network architecture. For illustration, the trained neural network model may be stored using the ASTORE procedure provided by SAS® Visual Data Mining and Machine Learning software.

Referring to FIG. 3A, in an operation 300, a first eigenvector $e_1$ and a vector of eigenvalues $\lambda_e$ are defined such that $\lambda_e = \lambda_1 \leq \lambda_2 \leq \ldots \leq \lambda_m$, where $\lambda_e$ is the eigenvalues sorted in increasing order, $e_1$ and $\lambda_1$ form a first eigen pair, and m is a total number of neurons across all layers. $\lambda_1, \lambda_2, \ldots, \lambda_m$ are diagonals of the B matrix.

Figure 4A:
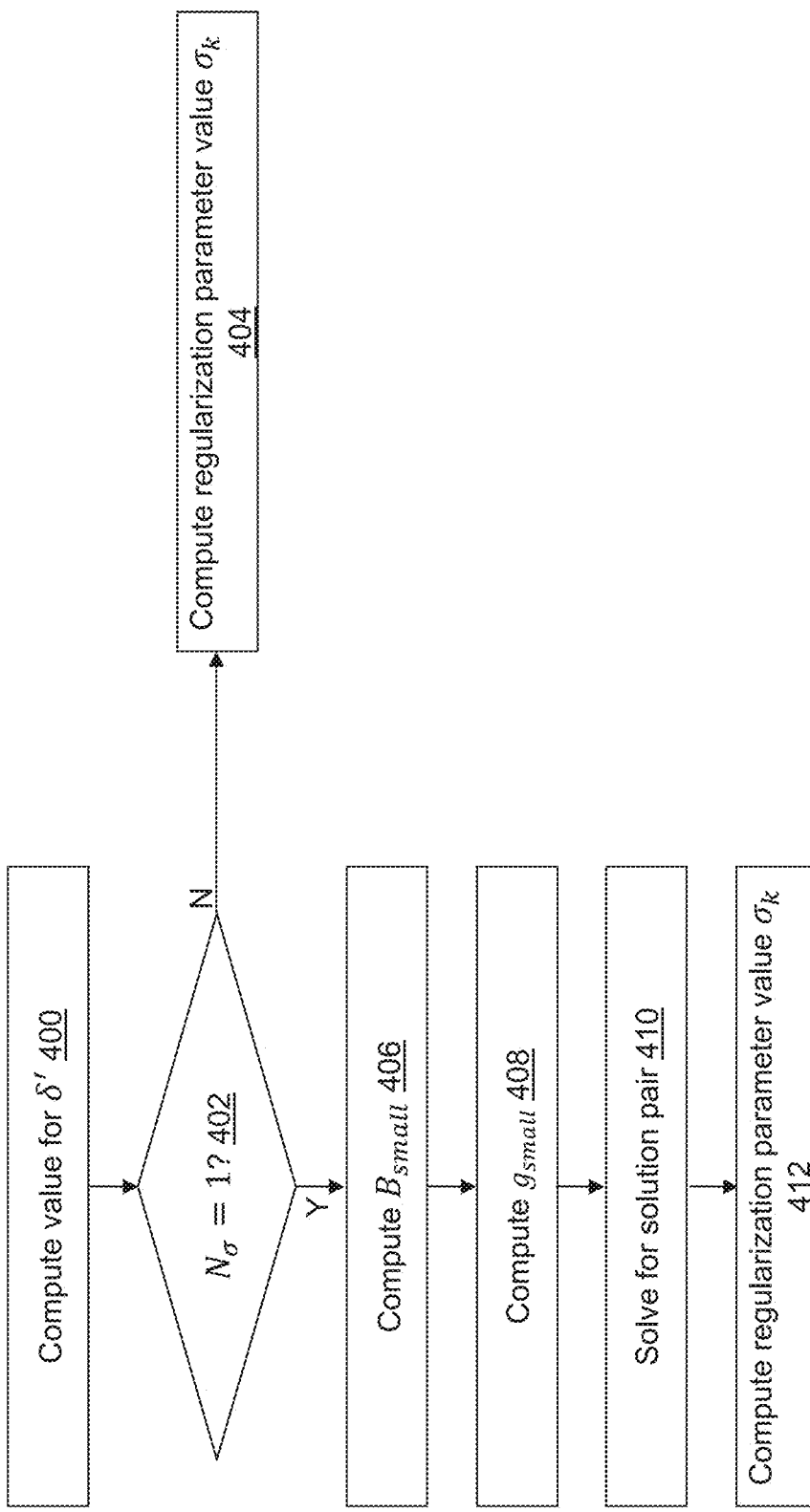

In an operation 302, an updated value for the regularization parameter value $\sigma_k$ is computed, for example, using $\sigma_k = \max(\sigma_k, \sigma_{k,AA})$, where $\sigma_{k,AA}$ is computed using the operations described in FIG. 4A with the vector of eigenvalues $\lambda_e$ and a gradient vector $g=g_k$, and processing continues in an operation 304.

In operation 304, a determination is made concerning whether a solution is computable. For example, the solution may not be computable when the B matrix is indefinite, $e_1^T g = 0$, and $$\|\mu(-\lambda_1)\| < \frac{\beta}{\sigma_k},$$

where $\mu(-\lambda_1) = -(B+(-\lambda_1)I)^{-1} g$. When not otherwise provided, an initial value for β may be defined as $\beta = \max(0, -\lambda_1) + 1e-10$ prior to operation 304. When the solution is computable, processing continues in an operation 306. When the solution is not computable, processing continues in an operation 308.

In operation 306, a solution for a parameter α is computed by solving $-\lambda_1 = \sigma_k \|-(B_{k-1}+(-\lambda_1)I)^{-1} g + \alpha e_1\|$, which can be rearranged to define a one-dimensional quadratic equation $(-\lambda_1)^2 = \sigma_k(\|-*B_{k-1}+(-\lambda_1)I)^{-1} g + \alpha e_1\|)^2$.

In an operation 308, the search direction vector $s_k$ is computed, for example, using $s_k = -(B_{k-1}+(-\lambda_1)I)^{-1} g + \alpha e_1$, and processing continues in operation 250 shown referring to FIG. 2B.

Figure 4B:
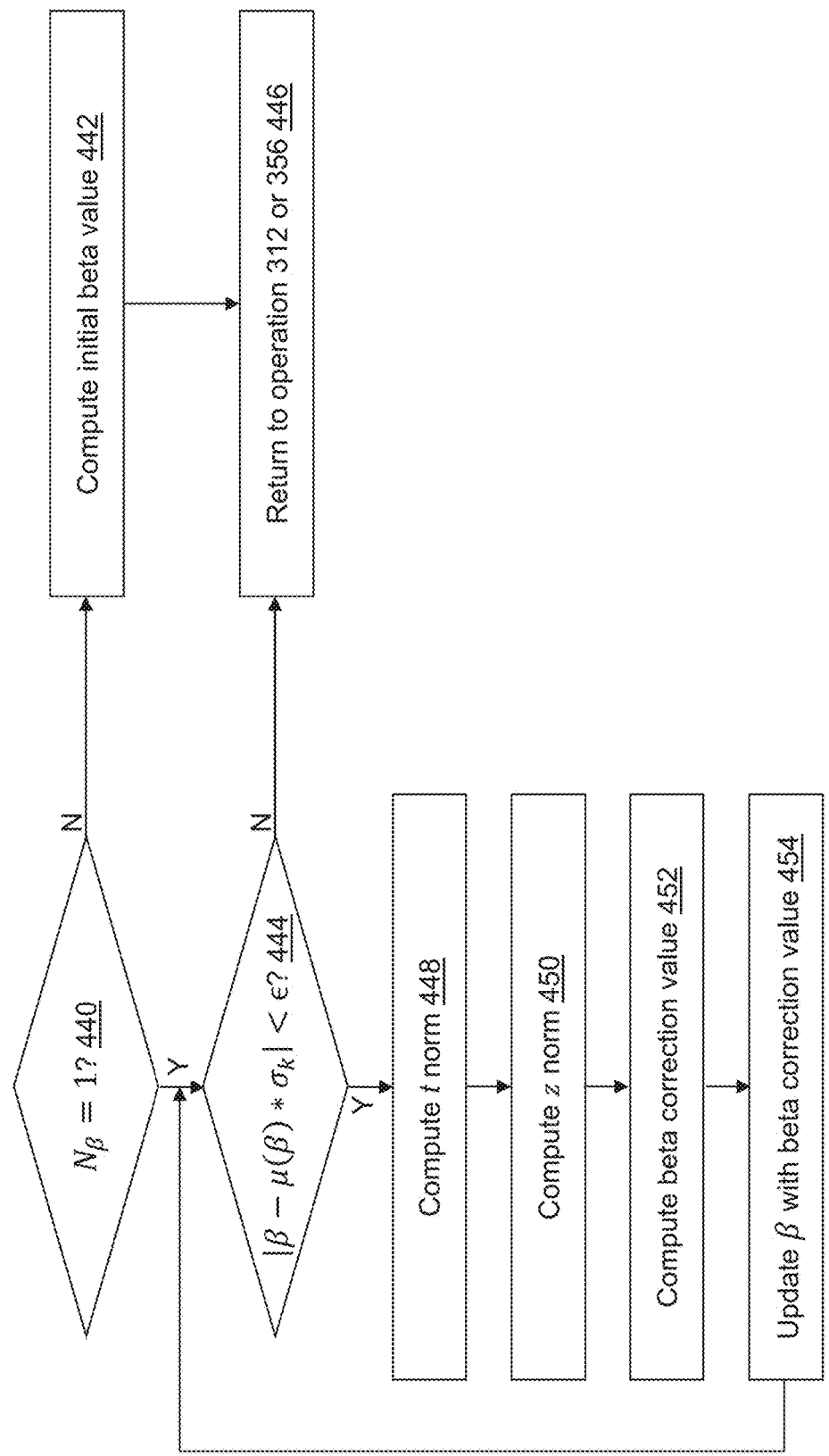

In operation 310, an initial value for the beta parameter value β is computed using the operations described in FIG. 4B with the vector of eigenvalues $\lambda_e$ and the gradient vector $g=g_k$, and processing continues in an operation 312.

In operation 312, a determination is made concerning whether $|\beta - \mu(\beta)^* \sigma_k| < \epsilon$, where $\mu(\beta) = -(B_{k-1}+\beta I)^{-1} g$ on a first iteration of operation 312 after operation 310, and ε has a predefined value such as 1e-5. Values other than 1e-5 may be used in alternative embodiments. When $|\beta - \mu(\beta)^* \sigma_k| < \epsilon$, processing continues in an operation 316. When $|\beta - \mu(\beta)^* \sigma_k| \geq \epsilon$, processing continues in an operation 314.

$$\phi_1(\beta) = \frac{1}{\|\mu(\beta)\|} - \frac{\sigma_k}{\beta}$$

may be referred to as a beta convergence parameter value. The test $|\beta - \mu(\beta)^* \sigma_k| < \epsilon$ is a more stable test than $\phi_1(\beta) \neq 0$ and prevents over-solving to the point of generating numerical instabilities.

In operation 314, the search direction vector $s_k$ is computed, for example, using $s_k = \mu(\beta) = -(B_{k-1}+\beta I)^{-1} g$, and processing continues in operation 250 shown referring to FIG. 2B.

In operation 316, a μ norm value is computed, for example, using $$\|\mu(\beta)\| = \sqrt{\sum_{i=1}^{m} \frac{g(i)^2}{(\lambda_e(i) + \beta)^2}}.$$

The μ norm value computed in operation 316 is used on a next iteration of operation 312 to replace the previous value.

In an operation 318, a z norm value is computed, for example, using $$\|z\|^2 = \sum_{i=1}^{m} \frac{g_i^2}{(\lambda_i + \beta)^3}.$$

In an operation 320, a beta correction value is computed, for example, using $$\Delta\beta = \frac{\beta\left(\|\mu(\beta)\| - \frac{\beta}{\sigma_k}\right)}{\|\mu(\beta)\| + \frac{\beta}{\sigma_k}\left(\frac{\beta\|z\|^2}{\|\mu(\beta)\|^2}\right)}.$$

In an operation 322, the value of β is updated, for example, using $\beta = \beta + \Delta\beta$, and processing continues in operation 312 with the updated value of β, $\|\mu(\beta)\|$, and $\|z\|^2$.

Referring to FIG. 3B, in an operation 340, a $\hat{\Lambda}$ matrix is computed, for example, using $\hat{\Lambda} = \gamma I + \Lambda^{-1}$, where the generalized eigenvalue problem $[V, \Lambda] = \text{eig}(M, T)$ is solved to define V, Λ, $B_{k-1} = \gamma I + \Psi M^{-1} \Psi^T = U \Lambda U^T$ and $T = \Psi^T \Psi$, γ is a smallest eigenvalue of the $B_{k-1}$ matrix, $$\Lambda = \begin{pmatrix} \gamma I & 0 \\ 0 & \hat{\Lambda} \end{pmatrix},$$

and $\hat{\Lambda}$ is a diagonal matrix. For L-SR1, $\Psi = Y - \gamma S$ and $M = (E - \gamma S^T S)$, where E is a symmetric approximation of the matrix $S^T Y$ using lower triangular elements equal that of $S^T Y$ to overwrite the upper triangular elements. For L-BFGS, $$M = \begin{bmatrix} S^T S/\gamma & L/\gamma \\ L^T/\gamma & -E \end{bmatrix},$$

where L is the lower triangular elements of $S^T Y$ and E is a diagonal matrix defined from $S^T Y$. The matrix $T = \Psi^T \Psi$ may be stored and updated incrementally such that when one column of Ψ is replaced, only one row and column of T is updated. Using L-SR1, matrices M and T have dimension $N_p \times N_p$, and Ψ has dimension $m \times N_p$. Using L-BFGS matrices M and T have dimension $2N_p \times 2N_p$, and Ψ has dimension $m \times 2N_p$. For illustration, γ can be defined as a constant value near or equal to zero. As another option, γ can be defined using logic outlined in Erway, Jennifer B., et al. "Trust-region algorithms for training responses: machine learning methods using indefinite Hessian approximations" Optimization Methods and Software 35.3 (2020): 460-487. For illustration, eig(M, T) can be solved using a function scipy.linalg.eigh described in a SciPy v1.9.0 Manual published by The SciPy community.

In an operation 342, a second portion $\hat{g}_2$ of the gradient vector is computed, for example, using $\hat{g}_2 = V^T \Psi^T g_k$. A vector $u = \Psi^T g_k$ may be computed and used to compute the second portion $\hat{g}_2$ of the gradient vector. Second portion $\hat{g}_2$ has $N_p$ entries.

In an operation 344, a norm of a first portion $\hat{g}_1$ of the gradient vector is computed, for example, using $\|\hat{g}_1\|^2 = g_k^T g_k - \hat{g}_2^T \hat{g}_2$. First portion $\hat{g}_1$ has $m - N_p$ entries.

In an operation 345, a first eigenvector $u_1$ and a vector of eigenvalues $\lambda_e$ are defined such that $\lambda_e = \lambda_1, \lambda_2, \ldots, \lambda_{N_p}, \gamma$ for L-SR1 and $\lambda_e = \lambda_1, \lambda_2, \ldots, \lambda_{2N_p}, \gamma$ for L-BFGS. $u_1$ and $\lambda_1$ form a most negative eigenvector and eigenvalue pair of the $B_{k-1}$ matrix. When $$\gamma < \min(\text{diag}(\hat{\Lambda})), u_1 = \frac{\hat{r}}{\|\hat{r}\|},$$

where $\hat{r} = (I - U_2 U_2^T) r$ for any vector such that $\|\hat{r}\| > 0$, $U_2 = \Psi V$, and r may be defined as $r = g_k$, where when $\|\hat{r}\| = 0$, r=random $(N_p, 1)$; otherwise, $u_1 = \Psi v$, v is a column of V that corresponds to the smallest eigenvalue of $\hat{\Lambda}$. $\lambda_1, \lambda_2, \ldots, \lambda_{N_p}$ are diagonals of the $\hat{\Lambda}$ matrix such that $\lambda_1 \leq \lambda_2 \leq \ldots \leq \lambda_{N_p}$.

In an operation 346, an updated value for the regularization parameter value $\sigma_k$ is computed, for example, using $\sigma_k = \max(\sigma_k, \sigma_{k,AA})$, where $\sigma_{k,AA}$ is computed using the operations described in FIG. 4A with the vector of eigenvalues $\lambda_e$ and the gradient vector $g = \hat{g}_2, \|\hat{g}_1\|^2$, and processing continues in an operation 348.

In operation 348, a determination is made concerning whether a solution is computable. For example, the solution may not be computable when the B matrix is indefinite, $u_1^T g_k = 0$, and $$\|\mu(-\lambda_1)\| < \frac{\beta}{\sigma_k},$$

where $\mu(-\lambda_1) = -(B_{k-1} + (-\lambda_1)I)^{-1} g_k$. When the solution is computable, processing continues in an operation 354. When the solution is not computable, processing continues in an operation 350.

Similar to operation 306, in operation 350, a solution for a parameter $\alpha$ is computed by solving $-\lambda_1 = \sigma_k \| - (B_{k-1} + (-\lambda_1)I)^{-1} g_k + \alpha u_1 \|$.

In an operation 352, the search direction vector $s_k$ is computed, for example, using $s_k = -(B_{k-1} + (-\lambda_1)I)^{-1} g_k + \alpha u_1$, and processing continues in operation 250 shown referring to FIG. 2B.

In operation 354, an initial value for the beta parameter value $\beta$ is computed using the operations described in FIG. 4B with the vector of eigenvalues $\lambda_e$ and a gradient vector $g = \hat{g}_2, \|\hat{g}_1\|^2$, and processing continues in an operation 356.

Similar to operation 312, in operation 356, a determination is made concerning whether $|\beta - \mu(\beta) * \sigma_k| < \epsilon$, where $\mu(\beta) = -(B_{k-1} + \beta I)^{-1} g$ on a first iteration of operation 356 after operation 354. When $|\beta - \mu(\beta) * \sigma_k| < \epsilon$, processing continues in an operation 360. When $|\beta - \mu(\beta) * \sigma_k| < \epsilon$, processing continues in an operation 358.

In operation 358, the search direction vector $s_k$ is computed, for example, using $s_k = \mu(\beta) = -(B_{k-1} + \beta I)^{-1} g$, and processing continues in operation 250 shown referring to FIG. 2B.

In operation 360, a $\mu$ norm value is computed, for example, using $$\|\mu(\beta)\| = \frac{\|\hat{g}_1\|^2}{(\gamma + \beta)^2} + \sum_{i=1}^{m} \frac{\hat{g}_{2,i}^2}{(\lambda_i + \beta)^2}.$$

The $\mu$ norm value computed in operation 360 is used on a next iteration of operation 356.

In an operation 362, a z norm value is computed, for example, using $$\|z\|^2 = \frac{\|\hat{g}_1\|^2}{(\gamma + \beta)^3} + \sum_{i=1}^{m} \frac{g_{2,i}^2}{(\lambda_i + \beta)^3}.$$

In an operation 364, a beta correction value is computed, for example, using $$\Delta \beta = \frac{\beta \left( \|\mu(\beta)\| - \frac{\beta}{\sigma_k} \right)}{\|\mu(\beta)\| + \frac{\beta}{\sigma_k} \left( \frac{\beta \|z\|^2}{\|\mu(\beta)\|^2} \right)}.$$

In an operation 366, the value of $\beta$ is updated, for example, using $\beta = \beta + \Delta\beta$, and processing continues in operation 356 with the updated value of $\beta$, $\|\mu(\beta)\|$, and $\|z\|^2$.

Referring to FIG. 4A, in an operation 400, a value for $\delta'$ is computed, for example, using $\delta' = \tau * s_{k-1}$, where $\tau$ is a predefined value such as $\tau = 1.5$.

In operation 402, a determination is made concerning whether $N_\sigma = 1$, where $N_\sigma$ is the sigma order value indicated in operation 224. When $N_\sigma = 1$, processing continues in an operation 404. When $N_\sigma > 1$, processing continues in an operation 406.

In operation 404, the regularization parameter value $\sigma_k$ is computed, for example, using $$\sigma_k = \frac{|g(1)| - \delta \lambda_e(1)}{\delta^2},$$

and processing continues in operation 304 if performed by operation 302 or in operation 348 if performed by operation 346.

In operation 406, $B_{small}$ is computed, for example, using $B_{small} = \text{diag}(\lambda_e(1), \ldots, \lambda_e(k))$.

In an operation 408, $g_{small}$ is computed, for example, using $g_{small} = \text{diag}(g(1), \ldots, g(k))^T$.

In an operation 410, a solution pair $(s_s, \lambda_s)$ is computed, for example, by solving a toy diagonal trust-region subproblem:

$$\min_{s \in \mathbb{R}^k} s^T g_{small} + 0.5 s^T B_{small} s$$

subject to $\|s\| \leq \delta$.

In an operation 412, the regularization parameter value $\sigma_k$ is computed, for example, using $$\sigma_k = \frac{\lambda_s}{\|s_s\|},$$

and processing continues in operation 304 if performed by operation 302 or in operation 348 if performed by operation 346.

Referring to FIG. 4B, in an operation 440, a determination is made concerning whether $N_\beta=1$, where $N_\beta$ is the beta order value indicated in operation 224. When $N_\beta=1$, processing continues in an operation 442. When $N_\beta>1$, processing continues in an operation 444.

In an operation 442, the initial value for beta $\beta$ is computed, for example, using $$\beta = \frac{-\lambda_e(1) + \sqrt{(\lambda_e(1))^2 + 4\sigma_k|g(1)|}}{2},$$

where | | indicates an absolute value, and processing continues in an operation 446.

In operation 444, a determination is made concerning whether $\phi_1(\beta) \neq 0$, where $|\beta-\mu(\beta)^*\sigma_k| < \epsilon$, and $\mu(\beta) = -(B_{k-1} + \beta I)^{-1} g$ on a first iteration of operation 444 after operation 440. When $|\beta-\mu(\beta)^*\sigma_k| < \epsilon$, processing continues in an operation 448. When $|\beta-\mu^*\beta)^*\sigma_k| < \epsilon$, processing continues in operation 446.

In operation 446, the current value for beta $\beta$ is returned or otherwise provided, and processing continues in operation 312 if performed by operation 310 or in operation 356 if performed by operation 354.

In operation 448, a $\mu$ norm value is computed, for example, using $$\|\mu(\beta)\| = \sqrt{\sum_{k=1}^{N_\beta} \frac{g(i)^2}{(\lambda_e(i) + \beta)^2}}.$$

The $\mu$ norm value computed in operation 448 is used on a next iteration of operation 444.

In an operation 450, a z norm value is computed, for example, using $$\|z\|^2 = \sum_{k=1}^{N_\beta} \frac{g(i)^2}{(\lambda_e(i) + \beta)^3}.$$

In an operation 452, a beta correction value is computed, for example, using $$\Delta\beta = \frac{\beta\left(\|\mu(\beta)\|\frac{\beta}{\sigma_k}\right)}{\|\mu(\beta)\| + \frac{\beta}{\sigma_k}\left(\frac{\beta\|z\|^2}{\|\mu(\beta)\|^2}\right)}.$$

In an operation 454, the value of $\beta$ is updated, for example, using $\beta = \beta + \Delta\beta$, and processing continues in operation 444 with the updated value of $\beta$, $\|\mu(\beta)\|$, and $\|z\|^2$.

Second-order methods can, at times, be unstable. To achieve good performance and stable training, heuristics may be applied to prevent or alleviate the instability. For example, if steps taken multiple times in a row are very similar to each other, or if the steps are very small, issues may arise such that $S_k$ becomes singular or $B_k$ becomes ill conditioned. Before updating $B_k$ in operations 262 and 276, the following may be performed:

$$y_{k+1} = \frac{y_{k+1}}{\max(\|\mu(\beta)\|, \kappa)}$$

and $$w_{k+1} = \frac{w_{k+1}}{\max(\|\mu(\beta)\|, \kappa)}$$

to prevent $B_k$ from becoming ill conditioned when $\|\mu(\beta)\|$ is very small, where $\kappa$ is a predefined value such as $\kappa=1e-7$. $B_k$ may be reset when the minimum eigenvalue of $S_k^T S_k$ is less than $\kappa$. When $B_k$ is reset, the first and last columns of $S_k$ and $Y_k$ are dropped instead of setting $B_k=I$ to prevent the reset from destroying too much curvature information.

Figure 5:
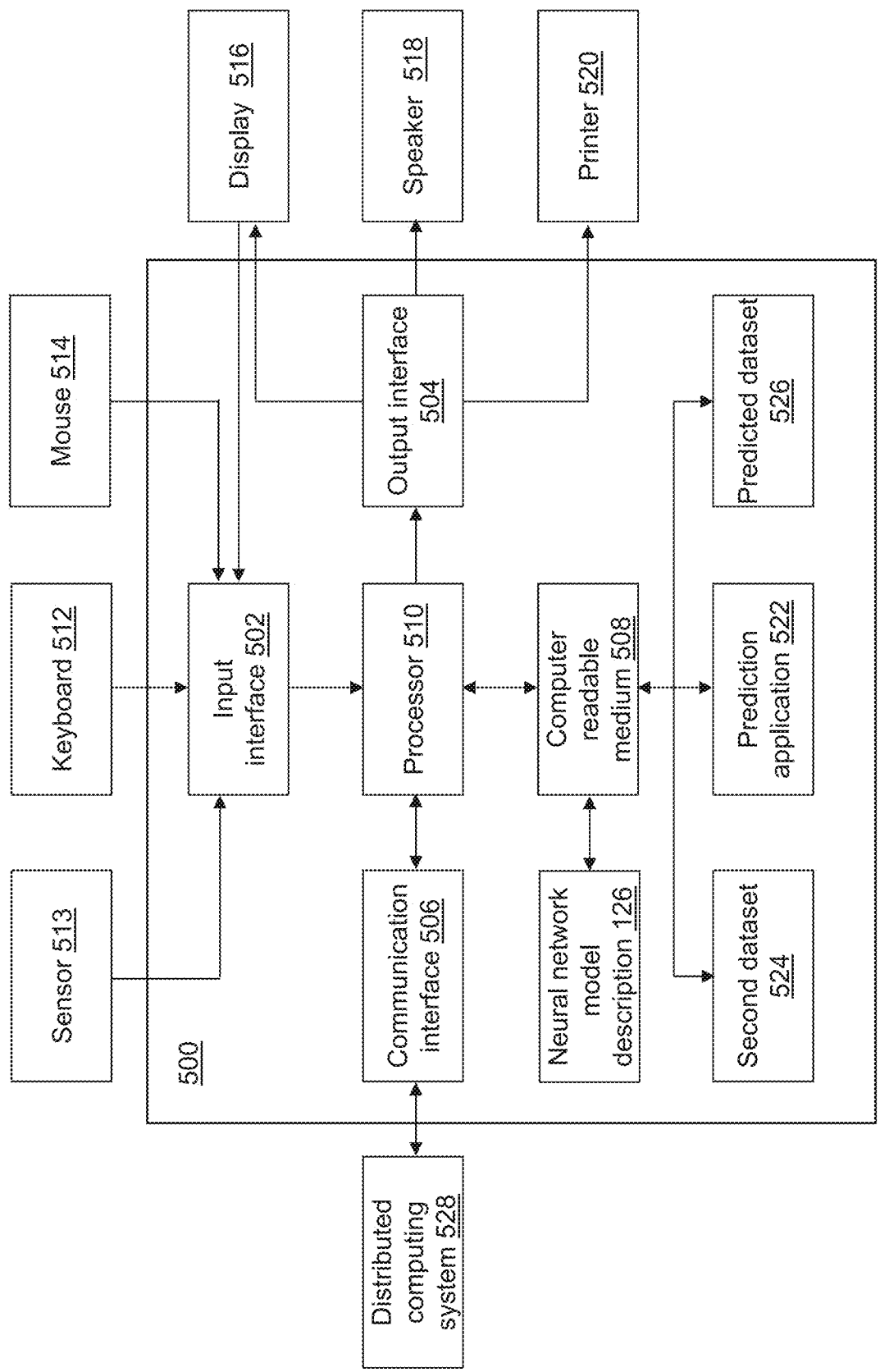
FIG. 5 depicts a block diagram of a prediction device in accordance with an illustrative embodiment.

Referring to FIG. 5, a block diagram of a prediction device 500 is shown in accordance with an illustrative embodiment. Prediction device 500 may include a second input interface 502, a second output interface 504, a second communication interface 506, a second non-transitory computer-readable medium 508, a second processor 510, a prediction application 522, neural network model description 126, second dataset 524, and predicted dataset 526. Fewer, different, and/or additional components may be incorporated into prediction device 500. Prediction device 500 and neural network model training device 100 may be the same or different devices.

Second input interface 502 provides the same or similar functionality as that described with reference to input interface 102 of neural network model training device 100 though referring to prediction device 500. Second output interface 504 provides the same or similar functionality as that described with reference to output interface 104 of neural network model training device 100 though referring to prediction device 500. Second communication interface 506 provides the same or similar functionality as that described with reference to communication interface 106 of neural network model training device 100 though referring to prediction device 500. Data and messages may be transferred between prediction device 500 and a distributed computing system 528 using second communication interface 506. Distributed computing system 130 and distributed computing system 528 may be the same or different computing systems. Second computer-readable medium 508 provides the same or similar functionality as that described with reference to computer-readable medium 108 of neural network model training device 100 though referring to prediction device 500. Second processor 510 provides the same or similar functionality as that described with reference to processor 110 of neural network model training device 100 though referring to prediction device 500.

Prediction application 522 performs operations associated with classifying or predicting a characteristic value related to each observation vector included in second dataset 524. The predicted characteristic value may be stored in predicted dataset 526 to support various data analysis functions as well as provide alert/messaging related to each prediction that may be a classification. Dependent on the type of data stored in training dataset 124 and second dataset 524, prediction application 522 may identify anomalies as part of process control, for example, of a manufacturing process, for machine condition monitoring, for image classification, for intrusion detection, for fraud detection, for voice recognition, for language translation, etc. Some or all of the operations described herein may be embodied in prediction application 522. The operations may be implemented using hardware, firmware, software, or any combination of these methods.

Referring to the example embodiment of FIG. 5, prediction application 522 is implemented in software (comprised of computer-readable and/or computer-executable instructions) stored in second computer-readable medium 508 and accessible by second processor 510 for execution of the instructions that embody the operations of prediction application 522. Prediction application 522 may be written using one or more programming languages, assembly languages, scripting languages, etc. Prediction application 522 may be integrated with other analytic tools. As an example, prediction application 522 may be part of an integrated data analytics software application and/or software architecture such as that offered by SAS Institute Inc. For example, prediction application 522 may be part of SAS® Enterprise Miner™. Merely for further illustration, prediction application 522 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/ORO, SAS/ETS®, SAS® Visual Analytics, SAS® Viya™, SAS In-Memory Statistics for Hadoop®, etc.

One or more operations of prediction application 522 further may be performed by an ESPE on an event stream instead of reading observation vectors from second dataset 524. Prediction application 522 and neural network model training application 122 may be the same or different applications that are integrated in various manners to train a neural network model using training dataset 124 that may be distributed on distributed computing system 130 and to execute the trained neural network model to predict the characteristic of each observation vector included in second dataset 524 that may be distributed on distributed computing system 528.

Prediction application 522 may be implemented as a Web application. Dependent on the type of data stored in training dataset 124 and second dataset 524, prediction application 522 may identify anomalies as part of process control, for example, of a manufacturing process, for machine condition monitoring, for image classification, for text recognition, for voice recognition, for intrusion detection, for fraud detection, etc.

Prediction application 522 may be integrated with other system processing tools to automatically process data generated as part of operation of an enterprise, to classify data in the processed data, and/or to provide a warning or alert associated with the prediction using second input interface 502, second output interface 504, and/or second communication interface 506 so that appropriate action can be initiated in response. For example, a warning or an alert may be presented using a second display 516, a second speaker 518, a second printer 520, etc. or sent to one or more computer-readable media, display, speaker, printer, etc. of distributed computing system 528.

Training dataset 124 and second dataset 524 may be generated, stored, and accessed using the same or different mechanisms. The target variable is not defined in second dataset 524. Similar to training dataset 124, second dataset 524 may include a plurality of rows and a plurality of columns with the plurality of rows referred to as observations or records, and the columns referred to as variables that are associated with an observation. Second dataset 524 may be transposed.

Similar to training dataset 124, second dataset 524 may be stored on second computer-readable medium 508 or on one or more computer-readable media of distributed computing system 528 and accessed by prediction device 500 using second communication interface 506. Data stored in second dataset 524 may be a sensor measurement or a data communication value, for example, from a sensor 513, may be generated or captured in response to occurrence of an event or a transaction, generated by a device such as in response to an interaction by a user with the device, for example, from a second keyboard 512 or a second mouse 514, etc. The data stored in second dataset 524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 524 may be captured at different time points periodically, intermittently, when an event occurs, etc. One or more columns may include a time value. Similar to training dataset 124, data stored in second dataset 524 may be generated as part of the IoT, and some or all data may be pre- or post-processed by an ESPE.

Similar to training dataset 124, second dataset 524 may be stored in various compressed formats such as a coordinate format, a compressed sparse column format, a compressed sparse row format, etc. Second dataset 524 further may be stored using various structures as known to those skilled in the art including a file system, a relational database, a system of tables, a structured query language database, etc. on prediction device 500 and/or on distributed computing system 528. Prediction device 500 may coordinate access to second dataset 524 that is distributed across a plurality of computing devices that make up distributed computing system 528. For example, second dataset 524 may be stored in a cube distributed across a grid of computers as understood by a person of skill in the art. As another example, second dataset 524 may be stored in a multi-node Hadoop® cluster. As another example, second dataset 524 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 524.

Figure 6:
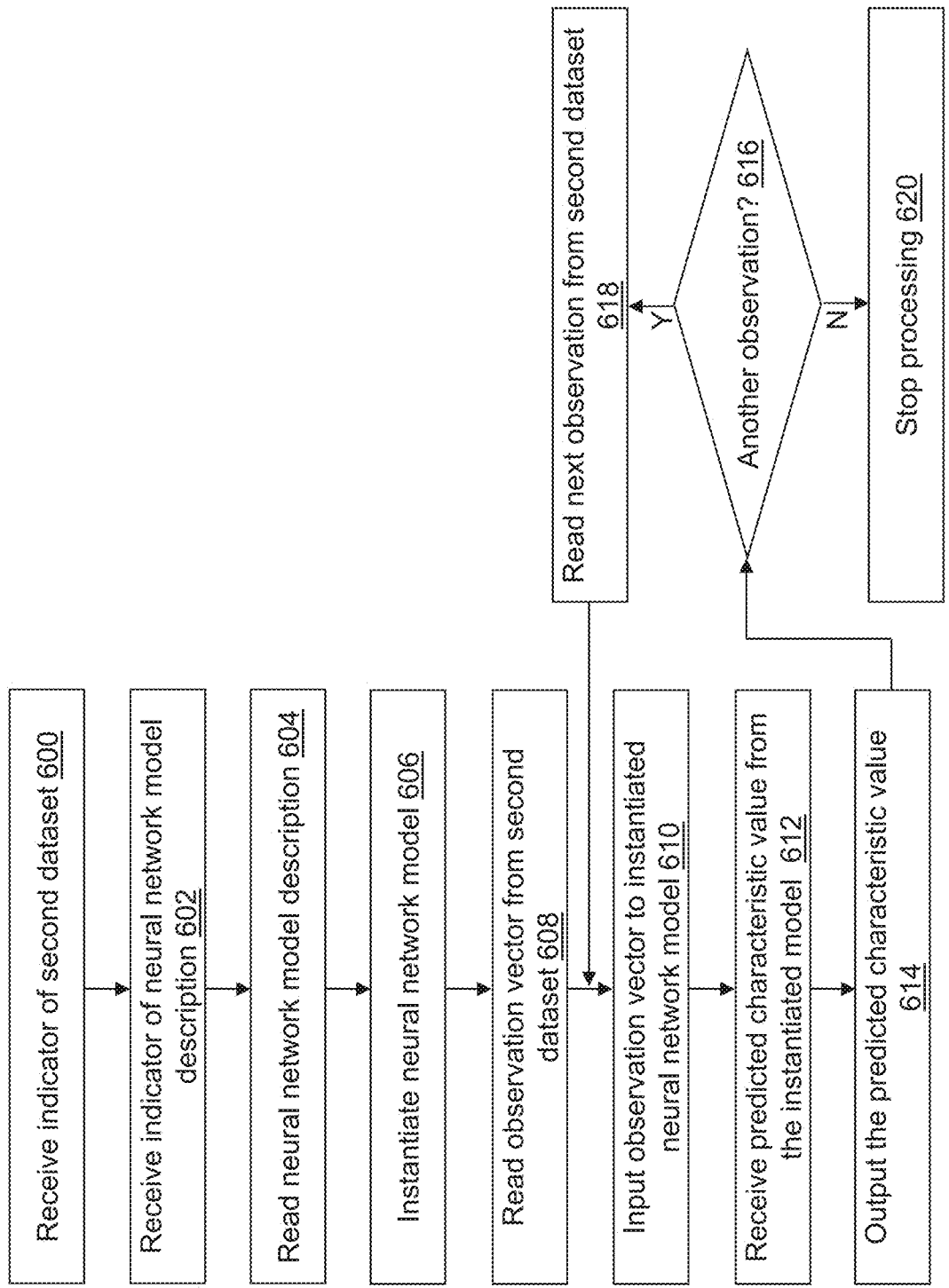
FIG. 6 depicts a flow diagram illustrating examples of operations performed by the prediction device of FIG. 5 in accordance with an illustrative embodiment.

Referring to FIG. 6, example operations of prediction application 522 are described. Additional, fewer, or different operations may be performed depending on the embodiment of prediction application 522. The order of presentation of the operations of FIG. 6 is not intended to be limiting. Although some of the operational flows are presented in sequence, the various operations may be performed in various repetitions, concurrently (in parallel, for example, using threads and/or distributed computing system 528), and/or in other orders than those that are illustrated.

In an operation 600, a sixteenth indicator may be received that indicates second dataset 524. For example, the sixteenth indicator indicates a location and a name of second dataset 524. As an example, the sixteenth indicator may be received by prediction application 522 after selection from a user interface window or after entry by a user into a user interface window. In an alternative embodiment, second dataset 524 may not be selectable. For example, a most recently created dataset may be used automatically.

In an operation 602, a seventeenth indicator may be received that indicates neural network model description 126. For example, the seventeenth indicator indicates a location and a name of neural network model description 126. As an example, the seventeenth indicator may be received by prediction application 522 after selection from a user interface window or after entry by a user into a user interface window. In an alternative embodiment, neural network model description 126 may not be selectable. For example, a most recently created model configuration data may be used automatically. As another example, neural network model description 126 may be provided automatically as part of integration with neural network model training application 122.

In an operation 604, a neural network model description is read from neural network model description 126.

In an operation 606, a neural network model is instantiated with the neural network model description. For example, the architecture of the neural network model, its hyperparameters, its weight vector, and other characterizing elements are read and used to instantiate a neural network model based on the information output from the training process in operation 292.

In an operation 608, an observation vector is read from second dataset 524.

In an operation 610, the observation vector is input to the instantiated model.

In an operation 612, a predicted characteristic value for the read observation vector is received as an output of the instantiated model. The output may include a probability that the observation vector has one or more different possible characteristic values.

In an operation 614, the predicted characteristic value may be output, for example, by storing the predicted characteristic value with the observation vector to predicted dataset 526. In addition, or in the alternative, the predicted characteristic value may be presented on second display 516, printed on second printer 520, sent to another computing device using second communication interface 506, an alarm or other alert signal may be sounded through second speaker 518, etc.

In an operation 616, a determination is made concerning whether or not second dataset 524 includes another observation vector. When second dataset 524 includes another observation vector, processing continues in an operation 618. When second dataset 524 does not include another observation vector, processing continues in an operation 620.

In operation 618, a next observation vector is read from second dataset 524, and processing continues in operation 610.

In operation 620, processing stops.

The operations of neural network model training application 122 can be executed in parallel to speed up the training process. Neural network model training application 122 may be executed in a synchronous mode that distributes the gradient computations across a plurality of worker computing devices. Each worker computing device computes the gradient for a portion of training dataset 124 that resides on that worker computing device, and the computed gradients are aggregated on a controller computing device. The weights are updated with the computed gradients and are sent to each worker computing device so that the processing for the next iteration can proceed with the updated weights.

Experimental results were generated using the operations of neural network model training application (NNMTA) 122, an existing SR1 algorithm, and an existing L-SR1 algorithm. The computing time to solve the cubic regularized subproblem are summarized in Table 1 below.

TABLE 1

| Method | S and Y matrix sizes | | | | | | |
|---|---|---|---|---|---|---|---|
| | 1e2 | 1e3 | 1e4 | 1e5 | 1e6 | 1e7 | 1e8 |
| SR1-hard | 3.71e−3 | 2.79e−1 | 1.03e−2 | — | — | — | — |
| L-SR1-hard | 4.47e−4 | 8.05e−4 | 3.16e−3 | 5.72e−3 | 4.05e−2 | 8.75e−1 | 7.41 |
| NNMTA 122-hard | 4.31e−4 | 7.34e−4 | 1.68e−3 | 4.47e−3 | 2.66e−2 | 6.44e−1 | 5.64 |
| SR1-indefinite | 1.93e−3 | 8.53e−2 | 11.7 | — | — | — | — |
| L-SR1-indefinite | 1.49e−3 | 3.54e−3 | 1.9e−2 | 4.4e−2 | 7.78e−1 | 8.55 | 81.4 |
| NNMTA 122-indefinite | 8.02e−4 | 1.69e−3 | 1.99e−3 | 2.79e−3 | 1.9e−2 | 2.59e−1 | 2.39 |
| SR1-positive definite | 1.39e−3 | 9.65e−1 | 92.3 | — | — | — | — |
| L-SR1-positive definite | 7.85e−3 | 1.64e−2 | 9.09e−2 | 1.48e−1 | 2.12 | 30.6 | 274 |
| NNMTA 122-positive definite | 3.64e−3 | 6.03e−3 | 6.45e−3 | 7.9e−3 | 2.68e−2 | 2.7e−1 | 2.33 |

All timing information is reported in seconds as an average across 10 runs. A hyphen indicates that the test did not terminate within 600 seconds. SR1 corresponds to an optimized SR1 implementation. L-SR1 corresponds to an optimized LSR1 implementation. NNMTA 122 corresponds to an optimized L-SR1 implementation that uses operations 316, 318, 320, and 322 of FIG. 3A. For limited memory experiments, $N_p=3$ was used. S and Y matrices were randomly generated with a size indicated in the column header multiplied times 3, and the g vector was randomly generated with a size indicated in the column header. The B matrix was defined to test different variations of the algorithm using different values for $\gamma$ and different formulations for the g vector to induce the different types of cases.

The SR1 algorithm failed to scale to more than 10,000 inputs. The traditional L-SR1 algorithm becomes infeasible at dimension 1e8 for the positive-definite case, where it takes 274 seconds to converge; whereas, NNMTA 122 takes only 2.33 seconds, a speedup of over 100×. Because the CR subproblem represents the bulk of the computation of any given optimization step, this performance increase greatly increases the scalability of the algorithm.

NNMTA 122 was used as the optimizer of an autoencoder as detailed in Goodfellow et al. and described below:

```
class CIFARAE(nn.Module):
    def_init_(self):
        super(CIFARAE, self)._init_( )
        self.encoder = nn.Sequential
            nn.Conv2d(3, 12, 4, stride=2, padding=1),
            nn.SELU( ),
            nn.Conv2d(12, 24, 4, stride=2, padding=1),
            nn.SELU( ),
```

```
    nn.Conv2d(24, 48, 4, stride=2, padding=1),
    nn.SELU( ),
)
self.decoder = nn.Sequential(
    nn.ConvTranspose2d(48, 24, 4, stride=2, padding=1),
    nn.SELU( ),
    nn.ConvTranspose2d(24, 12, 4, stride=2, padding=1),
    nn.SELU( ),
    nn.ConvTranspose2d(12, 3, 4, stride=2, padding=1),
)
def forward(self, x):
    encoded = self.encoder(x)
    decoded = self.decoder(encoded)
    return decoded
```

The results were compared to other algorithms such as SGD, Adam, Apollo, Adahessian, and L-BFGS. The CIFAR-10 dataset was used. The Hessian approximation matrix B was an L-SR1 matrix indicating that the form was not diagonal. For each optimizer executed, an autotuning process was executed to select the hyperparameter settings that led to the lowest test loss after ten epochs. For limited memory methods, the number of pairs $N_p=5$ was used. A convolutional neural network with three convolutional layers and then three transposed convolutional layers was used. For all layers, a padding and a stride were set to one and two, respectively. In-between all layers except the middle one and the final layer, scaled exponential linear unit activation function was used. The final layer used a sigmoid activation function. Layers have 3, 12, 24, 48, 24, 12 input channels, respectively. The results are summarized Table 2 below.

TABLE 2

| Optimizer | Cost ratio relative to SGD |
| --- | --- |
| SGD | 1 |
| Adam | 1 |
| Apollo | 1 |
| Adahessian | 1.01 |
| L-BFGS | 5.45 |
| NNMTA122 | 1.95 |

All computing times were averaged across 10 runs. While L-BFGS converges more rapidly, it is over twice as slow as NNMTA 122, and suffers from numerical stability issues. For example, of the ten runs performed using the L-BFGS algorithm, two failed due to a "not a number" loss indicator because the loss grew too large.

Figure 8:
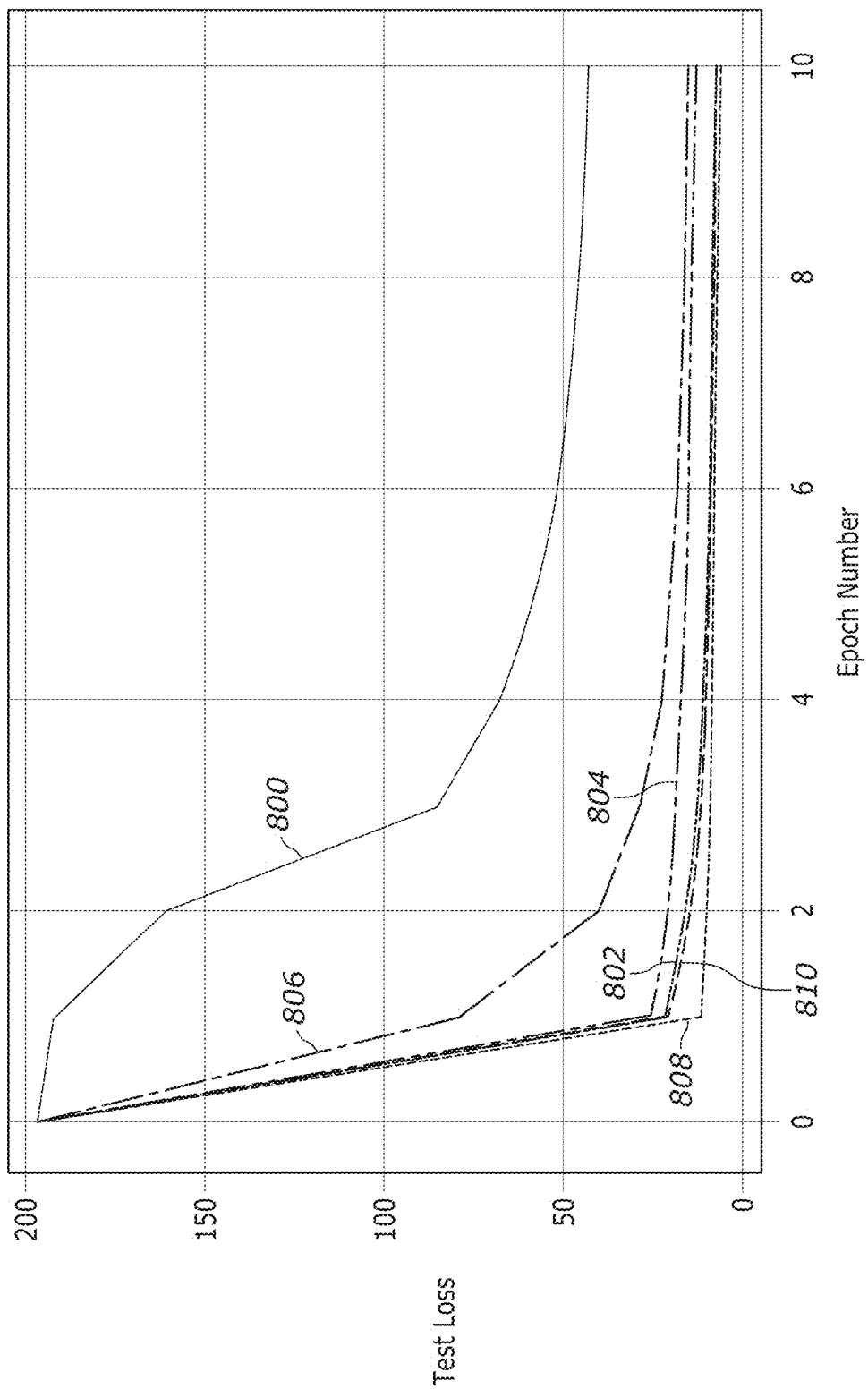
FIG. 8 shows a test loss comparison using the operations of the neural network model training application and using a preexisting neural network training methods in accordance with an illustrative embodiment.

Referring to FIG. 8, a test loss comparison is shown as a function of the epoch number when using NNMTA 122, SGD, Adam, Apollo, AdaHessian, and L-BFGS. A first loss curve 800 shows the test loss that results after each epoch using the SGD optimization algorithm. A second loss curve 802 shows the test loss that results after each epoch using the Adam optimization algorithm. A third loss curve 804 shows the test loss that results after each epoch using the Apollo optimization algorithm. A fourth loss curve 806 shows the test loss that results after each epoch using the AdaHessian optimization algorithm. A fifth loss curve 808 shows the test loss that results after each epoch using the L-BFGS optimization algorithm. A sixth loss curve 810 shows the test loss that results after each epoch using NNMTA 122.

NNMTA 122 was further used to perform experiments in image classification using the ImageNet dataset with the images cropped to 32×32. All experiments were executed on a single NVIDIA A100 GPU over 3 days. A modified version of ResNet-18 adapted for smaller image sizes was used as described in Xuezhe Ma, Apollo: *An adaptive parameter-wise diagonal quasi-newton method for nonconvex stochastic optimization* 2020 (*Ma*) including the best values for the hyperparameters. A positive-definite diagonal Hessian approximation as described in Ma was used to define the B matrix.

The results were compared to other algorithms such as SGD, Adam, RAdam, AdaBelief, and Apollo. The CIFAR-10 dataset was used. The Hessian approximation matrix B was a diagonal matrix. For each optimizer executed, an autotuning process was executed to select the hyperparameter settings that led to the lowest test loss after ten epochs. For limited memory methods, the number of pairs $N_p=5$ was used. A convolutional neural network with three convolutional layers and then three transposed convolutional layers was used. For all layers, a padding and a stride were set to one and two, respectively. In-between all layers except the middle one and the final layer, scaled exponential linear unit activation function was used. The final layer used a sigmoid activation function. Layers have 3, 12, 24, 48, 24, 12 input channels, respectively. The results are summarized in Table 3 below.

TABLE 3

| Optimizer | Best Top-1 accuracy | Best Top-5 accuracy | Cost ratio relative to SGD |
| --- | --- | --- | --- |
| SGD | 35.89 | 60.09 | 1 |
| Adam | 36.12 | 59.85 | 0.86 |
| RAdam | 34.89 | 62.06 | 0.9 |
| AdaBelief | 34.61 | 61.38 | 0.96 |
| Apollo | 36.38 | 61.74 | 0.76 |
| NNMTA 122 | 36.59 | 61.76 | 0.69 |

All computing times were averaged across ten runs. NNMTA 122 provided the best top-1 accuracy and also performed the computations the fastest. Unlike the other optimizers, NNMTA 122 also achieved strong results using the same hyperparameters as in the CIFAR-10 experiments, which is significant because NNMTA 122 outperformed the other optimizers without expensive hyperparameter tuning. Apollo, the optimizer proposed in Ma, requires a long warmup period for good performance. NNMTA 122 has no such requirement.

Figure 9:
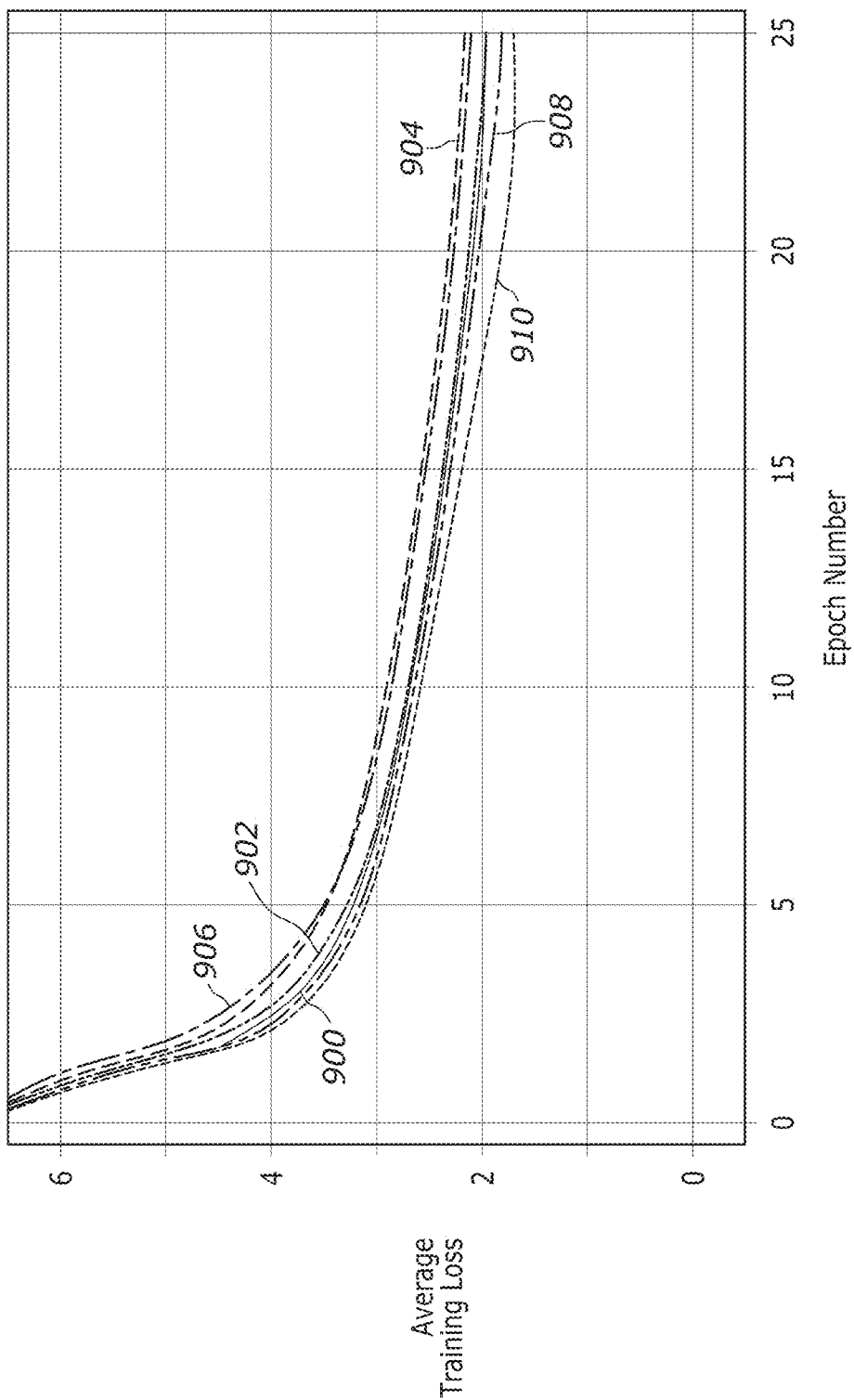
FIG. 9 shows a training loss comparison using the operations of the neural network model training application and using a preexisting neural network training methods in accordance with an illustrative embodiment.

Referring to FIG. 9, an average training loss comparison is shown as a function of the epoch number when using NNMTA 122, SGD, Adam, RAdam, AdaBelief, and Apollo. A first loss curve 900 shows the average training loss that results after each epoch using the SGD optimization algorithm. A second loss curve 902 shows the average training loss that results after each epoch using the Adam optimization algorithm. A third loss curve 904 shows the average training loss that results after each epoch using the RAdam optimization algorithm. A fourth loss curve 906 shows the average training loss that results after each epoch using the AdaBelief optimization algorithm. A fifth loss curve 908 shows the average training loss that results after each epoch using the Apollo optimization algorithm. A sixth loss curve 910 shows the average training loss that results after each epoch using NNMTA 122. NNMTA 122 provided the lowest average trading loss for all epochs.

Figure 10:
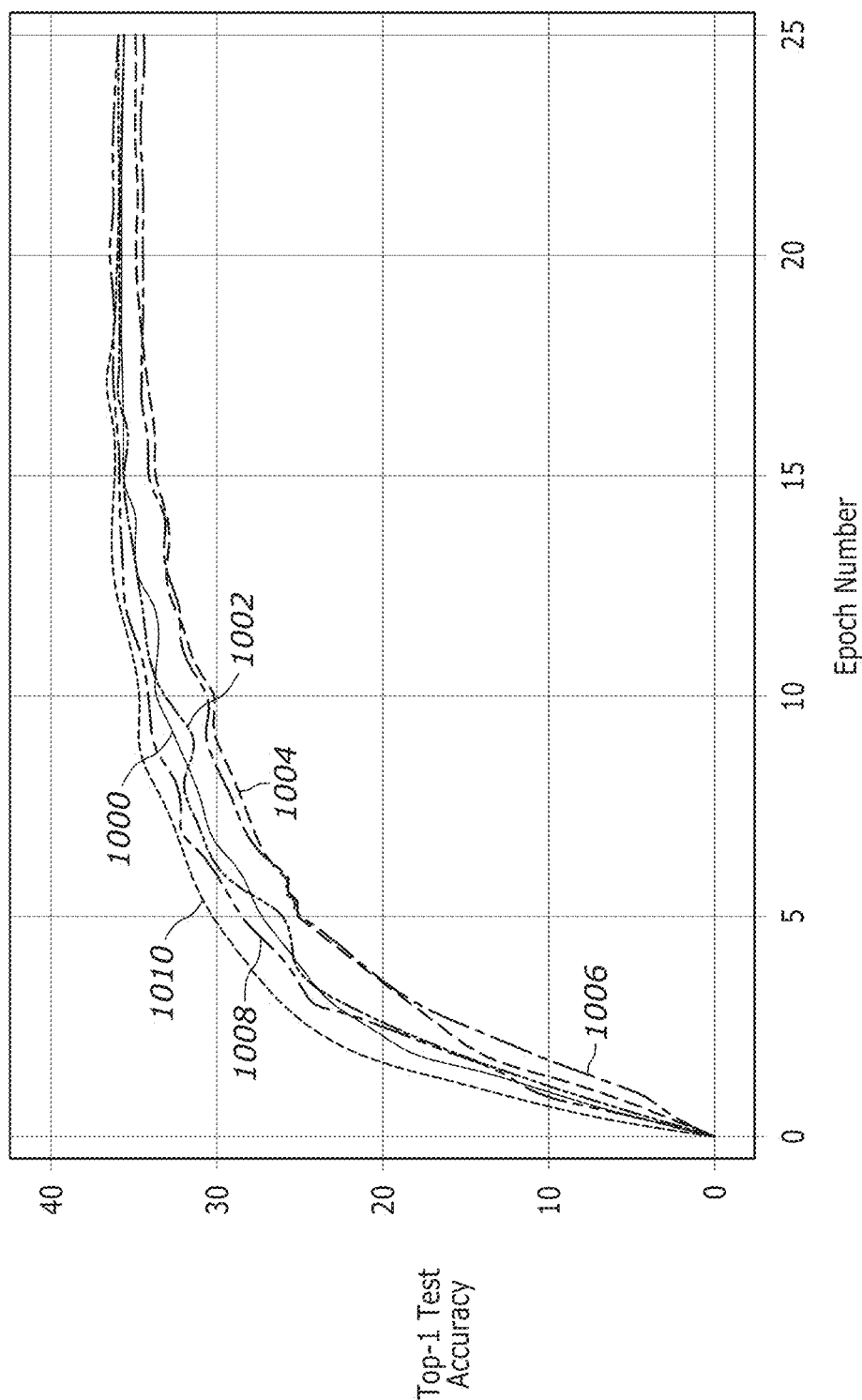
FIG. 10 shows a test accuracy comparison using the operations of the neural network model training application and using a preexisting neural network training methods in accordance with an illustrative embodiment.

Referring to FIG. 10, a top-1 accuracy comparison is shown as a function of the epoch number when using NNMTA 122, SGD, Adam, RAdam, AdaBelief, and Apollo. A first accuracy curve 1000 shows the accuracy that results after each epoch using the SGD optimization algorithm. A second accuracy curve 1002 shows the accuracy that results after each epoch using the Adam optimization algorithm. A third accuracy curve 1004 shows the accuracy that results after each epoch using the RAdam optimization algorithm. A fourth accuracy curve 1006 shows the accuracy that results after each epoch using the AdaBelief optimization algorithm. A fifth accuracy curve 1008 shows the accuracy that results after each epoch using the Apollo optimization algorithm. A sixth accuracy curve 1010 shows the accuracy that results after each epoch using NNMTA 122. NNMTA 122 provided the highest accuracy up to epoch 20 and at epoch 25 when the results included in Table 3 were generated.

There are applications for neural network model training application 122 and prediction application 522 in many areas such as process control and equipment health monitoring, image processing and classification, data segmentation, data analysis, voice processing and recognition, language translation, etc. The presented results demonstrate improved significantly improved accuracies with fewer iterations resulting in significantly faster computing times to achieve comparable or better results. The explosion of digital data is generating many opportunities for big data analytics, which in turn provides many opportunities for training neural network models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) select a batch of observation vectors, wherein the batch of observation vectors includes a mini-batch number of observation vectors selected from a plurality of observation vectors, wherein each observation vector of the plurality of observation vectors includes a value for each variable of a plurality of variables;
   (B) execute a neural network with a weight vector to compute a gradient vector using the selected batch of observation vectors, wherein the neural network includes a layer type for each layer of a plurality of neural network layers, wherein the weight vector includes a weight value defined for each neuron of the neural network, wherein the gradient vector includes a gradient value defined for each neuron of the neural network;
   (C) compute a vector of eigenvalues from a Hessian approximation matrix;
   (D) compute a regularization parameter value using the computed gradient vector, the computed vector of eigenvalues, and a step-size value;
   (E) compute a search direction vector using the computed vector of eigenvalues, the computed gradient vector, the Hessian approximation matrix, and the computed regularization parameter value;
   (F) compute a reduction ratio value as a ratio of a decrease in an objective function value from the execution of the neural network to a predicted decrease in the objective function value from the execution of the neural network;
   (G) compute an updated weight vector for each neuron of the neural network from the weight vector, a predefined learning rate value, and either the computed search direction vector or the computed gradient vector based on the computed reduction ratio value;
   (H) compute an updated Hessian approximation matrix from the Hessian approximation matrix, the predefined learning rate value, and either the computed search direction vector or the computed gradient vector based on the computed reduction ratio value, wherein, when $\rho \geq \eta_1$, the updated Hessian approximation matrix is computed using the computed search direction vector and a predefined first learning rate value, and when $\rho < \eta_1$, the updated Hessian approximation matrix is computed using the computed gradient vector and a predefined second learning rate value, where $\rho$ indicates the computed reduction ratio value, and $\eta_1$ indicates a predefined step success value;
   (I) update the step-size value using the computed search direction vector;
   (J) repeat (A) through (I) until a stop criterion is satisfied, wherein, on a next iteration of (A) through (I), the step-size value is the updated step-size value, and the weight vector is the computed, updated weight vector; and
   output the computed, updated weight vector to describe a trained neural network model.

2. The non-transitory computer-readable medium of claim 1, wherein the Hessian approximation matrix is a diagonal matrix, and the vector of eigenvalues are computed by ordering diagonal entries of the diagonal matrix from smallest to largest.

3. The non-transitory computer-readable medium of claim 1, wherein the Hessian approximation matrix is a non-diagonal matrix, and the vector of eigenvalues are computed by solving a generalized eigenvalue problem to define a diagonal matrix from which the vector of eigenvalues are defined.

4. The non-transitory computer-readable medium of claim 1, wherein the regularization parameter value is computed using $$\sigma_k = \frac{|g(1)| - \delta\lambda_e(1)}{\delta^2},$$

where $\sigma_k$ indicates the regularization parameter value for an iteration k, g(1) indicates a first entry of the computed gradient vector, $\lambda_e(1)$ indicates a smallest eigenvalue of the vector of eigenvalues, $\delta$ indicates the step-size value, and | | indicates an absolute value.

5. The non-transitory computer-readable medium of claim 1, wherein the regularization parameter value is computed using $$\sigma_k = \max\left(\sigma_k, \frac{|g(1)| - \delta\lambda_e(1)}{\delta^2}\right).$$

where $\sigma_k$ indicates the regularization parameter value for an iteration k, g(1) indicates a first entry of the computed gradient vector, $\lambda_e(1)$ indicates a smallest eigenvalue of the vector of eigenvalues, $\delta$ indicates the step-size value, and | | indicates an absolute value.

6. The non-transitory computer-readable medium of claim 1, wherein the regularization parameter value is computed using $$\sigma_{k'} = \frac{\lambda_s}{\|s_s\|},$$

where $(s_s, \lambda_s)$ are computed by solving a toy diagonal trust-region subproblem with the vector of eigenvalues and the computed gradient vector, and $\|\ \|$ indicates a Euclidean norm computation.

7. The non-transitory computer-readable medium of claim 6, wherein the regularization parameter value is computed using $\sigma_k = \max(\sigma_k, \sigma_{k'})$, where $\sigma_k$ indicates the regularization parameter value for an iteration k.

8. The non-transitory computer-readable medium of claim 1, wherein the reduction ratio value is computed using $$\rho_k = \frac{f(w_k) - f(w_k + s_k)}{f(w_k) - m_k(s_k)},$$

where $\rho_k$ indicates the reduction ratio value, $f(w_k)$ indicates an objective function value computed in (B), $f(w_k+s_k)$ indicates a second objective function value computed using a weight vector equal to $w_k+s_k$, $$m_k(s_k) = f(w_k) + s_k^T g_k + \frac{1}{2} s_k^T B_k s_k + \frac{1}{3} \sigma_k \|s_k\|^3,$$

$w_k$ indicates the weight vector, $g_k$ indicates the computed gradient vector, $B_k$ indicates the Hessian approximation matrix, $\sigma_k$ indicates the computed regularization parameter value, $s_k$ indicates the computed search direction vector, T indicates a transpose, and $\|\ \|$ indicates a Euclidean norm computation.

9. The non-transitory computer-readable medium of claim 1, wherein, when $\rho \geq \eta_1$, the updated weight vector is computed using the computed search direction vector and a predefined first learning rate value, and when $\rho < \eta_1$, the updated weight vector is computed using the computed gradient vector and a predefined second learning rate value, where $\rho$ indicates the computed reduction ratio value, and $\eta_1$ indicates a predefined step success value.

10. The non-transitory computer-readable medium of claim 9, wherein the predefined first learning rate value is different from the predefined second learning rate value.

11. The non-transitory computer-readable medium of claim 9, wherein the predefined first learning rate value is a positive value, and the predefined second learning rate value is a negative value.

12. The non-transitory computer-readable medium of claim 1, wherein computing the search direction vector comprises:
(K) computing a first vector using the computed Hessian approximation matrix, the computed gradient vector, and a beta value;
(L) computing a first norm value of the first vector using the computed vector of eigenvalues, the computed gradient vector, and the beta value;
(M) computing a second norm value of a second vector using the computed vector of eigenvalues, the computed gradient vector, and the beta value;
(N) computing a beta correction value using the computed first norm value, the computed second norm value, the beta value, and the computed regularization parameter value;
(O) updating the beta value using the beta value and the computed vector beta correction value;
(P) repeating (L) through (O) until a beta convergence parameter value is zero, wherein, on a next iteration of (L) through (O), the beta value is the updated beta value; and
(Q) computing the first vector using the computed Hessian approximation matrix, the computed gradient vector, and the updated beta value, wherein the computed search direction vector is the computed first vector.

13. The non-transitory computer-readable medium of claim 12, wherein the first vector is computed in (Q) using $\mu = -(B+\beta I)^{-1} g$, where $\mu$ indicates the first vector, B indicates the computed Hessian approximation matrix, $\beta$ indicates the updated beta value, I indicates an identity matrix having a dimension identical to a dimension of the computed Hessian approximation matrix, and g indicates the computed gradient vector.

14. The non-transitory computer-readable medium of claim 12, wherein, when the Hessian approximation matrix is a diagonal matrix, the first norm value is computed using $$\|\mu\| = \sqrt{\sum_{i=1}^{m} \frac{g_i^2}{(\lambda_i + \beta)^2}},$$

where $\mu$ indicates the first vector, $\|\ \|$ indicates a Euclidean norm computation, $g_i$ indicates an $i^{th}$ gradient of the computed gradient vector, $\lambda_i$ indicates an $i^{th}$ eigenvalue of the vector of eigenvalues, $\beta$ indicates the beta value, and m indicates a number of neurons of the neural network.

15. The non-transitory computer-readable medium of claim 14, wherein, when the Hessian approximation matrix is the diagonal matrix, the second norm value is computed using $$\|z\|^2 = \sum_{i=1}^{m} \frac{g_i^2}{(\lambda_i + \beta)^3},$$

where $\|z\|^2$ indicates the second norm value.

16. The non-transitory computer-readable medium of claim 12, wherein the beta value used in (K) is computed using $$\beta = \frac{-\lambda(1) + \sqrt{(\lambda(1))^2 + 4\sigma|g(1)|}}{2},$$

where β indicates the beta value, λ(1) indicates a first eigenvalue of the vector of eigenvalues, σ indicates the regularization parameter value, g(1) indicates a first gradient of the computed gradient vector, and | | indicates an absolute value.

17. The non-transitory computer-readable medium of claim 12, wherein the beta value used in (K) is computed by performing (K) through (P) with a predefined beta order value and a predefined beta value.

18. A non-transitory computer-readable medium having stored thereon computer-readable instructions that when executed by a computing device cause the computing device to:
- (A) select a batch of observation vectors, wherein the batch of observation vectors includes a mini-batch number of observation vectors selected from a plurality of observation vectors, wherein each observation vector of the plurality of observation vectors includes a value for each variable of a plurality of variables;
- (B) execute a neural network with a weight vector to compute a gradient vector using the selected batch of observation vectors, wherein the neural network includes a layer type for each layer of a plurality of neural network layers, wherein the weight vector includes a weight value defined for each neuron of the neural network, wherein the gradient vector includes a gradient value defined for each neuron of the neural network;
- (C) compute a vector of eigenvalues from a Hessian approximation matrix;
- (D) compute a regularization parameter value using the computed gradient vector, the computed vector of eigenvalues, and a step-size value;
- (E) compute a search direction vector using the computed vector of eigenvalues, the computed gradient vector, the Hessian approximation matrix, and the computed regularization parameter value;
- (F) compute a reduction ratio value as a ratio of a decrease in an objective function value from the execution of the neural network to a predicted decrease in the objective function value from the execution of the neural network;
- (G) compute an updated weight vector for each neuron of the neural network from the weight vector, a predefined learning rate value, and either the computed search direction vector or the computed gradient vector based on the computed reduction ratio value;
- (H) compute an updated Hessian approximation matrix from the Hessian approximation matrix, the predefined learning rate value, and either the computed search direction vector or the computed gradient vector based on the computed reduction ratio value;
- (I) update the step-size value using the computed search direction vector;
- (J) repeat (A) through (I) until a stop criterion is satisfied, wherein the regularization parameter value is updated after (F) and before (J) based on the computed reduction ratio value, wherein, on a next iteration of (A) through (I), the step-size value is the updated step-size value, and the weight vector is the computed, updated weight vector; and
- output the computed, updated weight vector to describe a trained neural network model.

19. The non-transitory computer-readable medium of claim 18, wherein when $\rho \geq \eta_1$ and $\rho \geq \eta_2$, the regularization parameter value is updated after (F) and before (J) using $$\sigma_{k+1} = \max\left(\frac{\sigma_k}{2}, \sigma_{min}\right),$$

where $\sigma_{k+1}$ indicates the regularization parameter value after the update, $\sigma_k$ indicates the regularization parameter value before the update, $\sigma_{min}$ indicates a predefined minimum regularization parameter value, ρ indicates the computed reduction ratio value, $\eta_1$ indicates a predefined, first step success value, and $\eta_2$ indicates a predefined, second step success value.

20. The non-transitory computer-readable medium of claim 18, wherein when $\rho < \eta_1$, the regularization parameter value is updated after (F) and before (J) using $\sigma_{k+1} = 2\sigma_k$, where $\sigma_{k+1}$ indicates the regularization parameter value after the update, and $\sigma_k$ indicates the regularization parameter value before the update, ρ indicates the computed reduction ratio value, and $\eta_1$ indicates a predefined, first step success value.

21. A non-transitory computer-readable medium having stored thereon computer-readable instructions that when executed by a computing device cause the computing device to:
- (A) select a batch of observation vectors, wherein the batch of observation vectors includes a mini-batch number of observation vectors selected from a plurality of observation vectors, wherein each observation vector of the plurality of observation vectors includes a value for each variable of a plurality of variables;
- (B) execute a neural network with a weight vector to compute a gradient vector using the selected batch of observation vectors, wherein the neural network includes a layer type for each layer of a plurality of neural network layers, wherein the weight vector includes a weight value defined for each neuron of the neural network, wherein the gradient vector includes a gradient value defined for each neuron of the neural network;
- (C) compute a vector of eigenvalues from a Hessian approximation matrix;
- (D) compute a regularization parameter value using the computed gradient vector, the computed vector of eigenvalues, and a step-size value;
- (E) compute a search direction vector using the computed vector of eigenvalues, the computed gradient vector, the Hessian approximation matrix, and the computed regularization parameter value;
- (F) compute a reduction ratio value as a ratio of a decrease in an objective function value from the execution of the neural network to a predicted decrease in the objective function value from the execution of the neural network;
- (G) compute an updated weight vector for each neuron of the neural network from the weight vector, a predefined learning rate value, and either the computed search direction vector or the computed gradient vector based on the computed reduction ratio value;

(H) compute an updated Hessian approximation matrix from the Hessian approximation matrix, the predefined learning rate value, and either the computed search direction vector or the computed gradient vector based on the computed reduction ratio value;

(I) update the step-size value using the computed search direction vector based on the computed reduction ratio value;

(J) repeat (A) through (I) until a stop criterion is satisfied, wherein, on a next iteration of (A) through (I), the step-size value is the updated step-size value, and the weight vector is the computed, updated weight vector; and output the computed, updated weight vector to describe a trained neural network model.

22. The non-transitory computer-readable medium of claim 21, wherein, when $\rho \geq \eta_1$, the updated Hessian approximation matrix is computed using the computed search direction vector and a predefined first learning rate value, and when $\rho < \eta_1$, the updated Hessian approximation matrix is computed using the computed gradient vector and a predefined second learning rate value, where $\rho$ indicates the computed reduction ratio value, $\eta_1$ indicates a predefined step success value.

23. The non-transitory computer-readable medium of claim 22, wherein the predefined first learning rate value is different from the predefined second learning rate value.

24. The non-transitory computer-readable medium of claim 22, wherein the predefined first learning rate value is a positive value, and the predefined second learning rate value is a negative value.

25. The non-transitory computer-readable medium of claim 21, wherein when $\rho < \eta_1$, the step-size value is updated using $$\delta = \frac{\|s_k\|}{2},$$

where $\delta$ indicates the step-size value, $s_k$ indicates the computed search direction vector, $\|\ \|$ indicates a Euclidean norm computation, $\rho$ indicates the computed reduction ratio value, and $\eta_1$ indicates a predefined, first step success value.

26. The non-transitory computer-readable medium of claim 21, wherein when $\rho \geq \eta_1$ and $\rho \geq \eta_2$, the step-size value is updated using $\delta = \|s_k\|$, where $\delta$ indicates the step-size value, $s_k$ indicates the computed search direction vector, $\|\ \|$ indicates a Euclidean norm computation, $\rho$ indicates the computed reduction ratio value, $\eta_1$ indicates a predefined, first step success value, and $\eta_2$ indicates a predefined, second step success value.

27. The non-transitory computer-readable medium of claim 26, wherein when $\rho \geq \eta_1$ and $\rho < \eta_2$, the step-size value is updated using $\delta = \|s_k\|$, where $\delta$ indicates the step-size value, $s_k$ indicates the computed search direction vector.

28. A non-transitory computer-readable medium having stored thereon computer-readable instructions that when executed by a computing device cause the computing device to:

(A) select a batch of observation vectors, wherein the batch of observation vectors includes a mini-batch number of observation vectors selected from a plurality of observation vectors, wherein each observation vector of the plurality of observation vectors includes a value for each variable of a plurality of variables;

(B) execute a neural network with a weight vector to compute a gradient vector using the selected batch of observation vectors, wherein the neural network includes a layer type for each layer of a plurality of neural network layers, wherein the weight vector includes a weight value defined for each neuron of the neural network, wherein the gradient vector includes a gradient value defined for each neuron of the neural network;

(C) compute a vector of eigenvalues from a Hessian approximation matrix;

(D) compute a regularization parameter value using the computed gradient vector, the computed vector of eigenvalues, and a step-size value;

(E) compute a search direction vector using the computed vector of eigenvalues, the computed gradient vector, the Hessian approximation matrix, and the computed regularization parameter value;

(F) compute a reduction ratio value as a ratio of a decrease in an objective function value from the execution of the neural network to a predicted decrease in the objective function value from the execution of the neural network;

(G) compute an updated weight vector for each neuron of the neural network from the weight vector, a predefined learning rate value, and either the computed search direction vector or the computed gradient vector based on the computed reduction ratio value;

(H) compute an updated Hessian approximation matrix from the Hessian approximation matrix, the predefined learning rate value, and either the computed search direction vector or the computed gradient vector based on the computed reduction ratio value;

(I) update the step-size value using the computed search direction vector;

(J) repeat (A) through (I) until a stop criterion is satisfied, wherein the stop criterion is a number of iterations of (J), wherein, on a next iteration of (A) through (I), the step-size value is the updated step-size value, and the weight vector is the computed, updated weight vector; and output the computed, updated weight vector to describe a trained neural network model.

29. A computing device comprising:

a processor; and a computer-readable medium operably coupled to the processor, the computer-readable medium having computer-readable instructions stored thereon that, when executed by the processor, cause the computing device to (A) select a batch of observation vectors, wherein the batch of observation vectors includes a mini-batch number of observation vectors selected from a plurality of observation vectors, wherein each observation vector of the plurality of observation vectors includes a value for each variable of a plurality of variables;

(B) execute a neural network with a weight vector to compute a gradient vector using the selected batch of observation vectors, wherein the neural network includes a layer type for each layer of a plurality of neural network layers, wherein the weight vector includes a weight value defined for each neuron of the neural network, wherein the gradient vector includes a gradient value defined for each neuron of the neural network;

(C) compute a vector of eigenvalues from a Hessian approximation matrix;

(D) compute a regularization parameter value using the computed gradient vector, the computed vector of eigenvalues, and a step-size value;

(E) compute a search direction vector using the computed vector of eigenvalues, the computed gradient vector, the Hessian approximation matrix, and the computed regularization parameter value;

(F) compute a reduction ratio value as a ratio of a decrease in an objective function value from the execution of the neural network to a predicted decrease in the objective function value from the execution of the neural network;

(G) compute an updated weight vector for each neuron of the neural network from the weight vector, a predefined learning rate value, and either the computed search direction vector or the computed gradient vector based on the computed reduction ratio value;

(H) compute an updated Hessian approximation matrix from the Hessian approximation matrix, the predefined learning rate value, and either the computed search direction vector or the computed gradient vector based on the computed reduction ratio value, wherein, when $\rho \geq \eta_1$, the updated Hessian approximation matrix is computed using the computed search direction vector and a predefined first learning rate value, and when $\rho < \eta_1$, the updated Hessian approximation matrix is computed using the computed gradient vector and a predefined second learning rate value, where $\rho$ indicates the computed reduction ratio value, and $\eta_1$ indicates a predefined step success value;

(I) update the step-size value using the computed search direction vector;

(J) repeat (A) through (I) until a stop criterion is satisfied, wherein, on a next iteration of (A) through (I), the step-size value is the updated step-size value, and the weight vector is the computed, updated weight vector; and output the computed, updated weight vector to describe a trained neural network model.

30. A method of training a neural network model, the method comprising:

(A) selecting, by a computing device, a batch of observation vectors, wherein the batch of observation vectors includes a mini-batch number of observation vectors selected from a plurality of observation vectors, wherein each observation vector of the plurality of observation vectors includes a value for each variable of a plurality of variables;

(B) executing, by the computing device, a neural network with a weight vector to compute a gradient vector using the selected batch of observation vectors, wherein the neural network includes a layer type for each layer of a plurality of neural network layers, wherein the weight vector includes a weight value defined for each neuron of the neural network, wherein the gradient vector includes a gradient value defined for each neuron of the neural network;

(C) computing, by the computing device, a vector of eigenvalues from a Hessian approximation matrix;

(D) computing, by the computing device, a regularization parameter value using the computed gradient vector, the computed vector of eigenvalues, and a step-size value;

(E) computing, by the computing device, a search direction vector using the computed vector of eigenvalues, the computed gradient vector, the Hessian approximation matrix, and the computed regularization parameter value;

(F) computing, by the computing device, a reduction ratio value as a ratio of a decrease in an objective function value from the execution of the neural network to a predicted decrease in the objective function value from the execution of the neural network;

(G) computing, by the computing device, an updated weight vector for each neuron of the neural network from the weight vector, a predefined learning rate value, and either the computed search direction vector or the computed gradient vector based on the computed reduction ratio value;

(H) computing, by the computing device, an updated Hessian approximation matrix from the Hessian approximation matrix, the predefined learning rate value, and either the computed search direction vector or the computed gradient vector based on the computed reduction ratio value, wherein, when $\rho \geq \eta_1$, the updated Hessian approximation matrix is computed using the computed search direction vector and a predefined first learning rate value, and when $\rho < \eta_1$, the updated Hessian approximation matrix is computed using the computed gradient vector and a predefined second learning rate value, where $\rho$ indicates the computed reduction ratio value, and $\eta_1$ indicates a predefined step success value;

(I) updating, by the computing device, the step-size value using the computed search direction vector;

(J) repeating, by the computing device, (A) through (I) until a stop criterion is satisfied, wherein, on a next iteration of (A) through (I), the step-size value is the updated step-size value, and the weight vector is the computed, updated weight vector; and outputting, by the computing device, the computed, updated weight vector to describe a trained neural network model.

* * * * *